US012168388B2

(12) United States Patent
Shimauchi

(10) Patent No.: US 12,168,388 B2
(45) Date of Patent: Dec. 17, 2024

(54) VEHICLE POWER MANAGEMENT SYSTEM

(71) Applicant: TOYOTA JIDOSHA KABUSHIKI KAISHA, Toyota (JP)

(72) Inventor: Takayuki Shimauchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 228 days.

(21) Appl. No.: 17/971,068

(22) Filed: Oct. 21, 2022

(65) Prior Publication Data

US 2023/0150340 A1    May 18, 2023

(30) Foreign Application Priority Data

Nov. 12, 2021 (JP) ................................. 2021-184466

(51) Int. Cl.
*B60H 1/00* (2006.01)

(52) U.S. Cl.
CPC ..... *B60H 1/00921* (2013.01); *B60H 1/00278* (2013.01); *B60H 2001/00307* (2013.01)

(58) Field of Classification Search
CPC ............ B60H 1/00921; B60H 1/00278; B60H 2001/00307; B60H 1/00428; B60H 1/00778
See application file for complete search history.

(56) References Cited

U.S. PATENT DOCUMENTS

2012/0306263 A1* 12/2012 Tashiro ................... B60L 58/20
307/9.1

FOREIGN PATENT DOCUMENTS

| CN | 112996689 A * | 6/2021 | ............ H01M 10/48 |
| JP | 2016-107910 A | 6/2016 | |
| WO | WO-2019181311 A1 * | 9/2019 | |
| WO | WO-2020075446 A1 * | 4/2020 | ......... B60H 1/00278 |

* cited by examiner

*Primary Examiner* — Kun Kai Ma
(74) *Attorney, Agent, or Firm* — Dinsmore & Shohl LLP

(57) ABSTRACT

A vehicle power management system includes a battery, an air conditioner driven by power of the battery, an external power supply device that enables external power supply where the power of the battery is supplied to an external electric device, and a determination unit. The determination unit determines whether an operation restriction of an air conditioner is executed during the external power supply. The determination unit determines that the operation restriction is executed when all of following four conditions are satisfied: (A-1) a target blowout temperature is less than a predetermined blowout threshold temperature during cooling; (A-2) an outside air temperature exceeds a predetermined outside air threshold temperature during cooling; (A-3) a refrigerant temperature after heat is exchanged with an air blown into the vehicle cabin exceeds a predetermined refrigerant threshold temperature during cooling; and (A-4) a blower air volume of the air conditioner exceeds a predetermined threshold air volume.

8 Claims, 22 Drawing Sheets

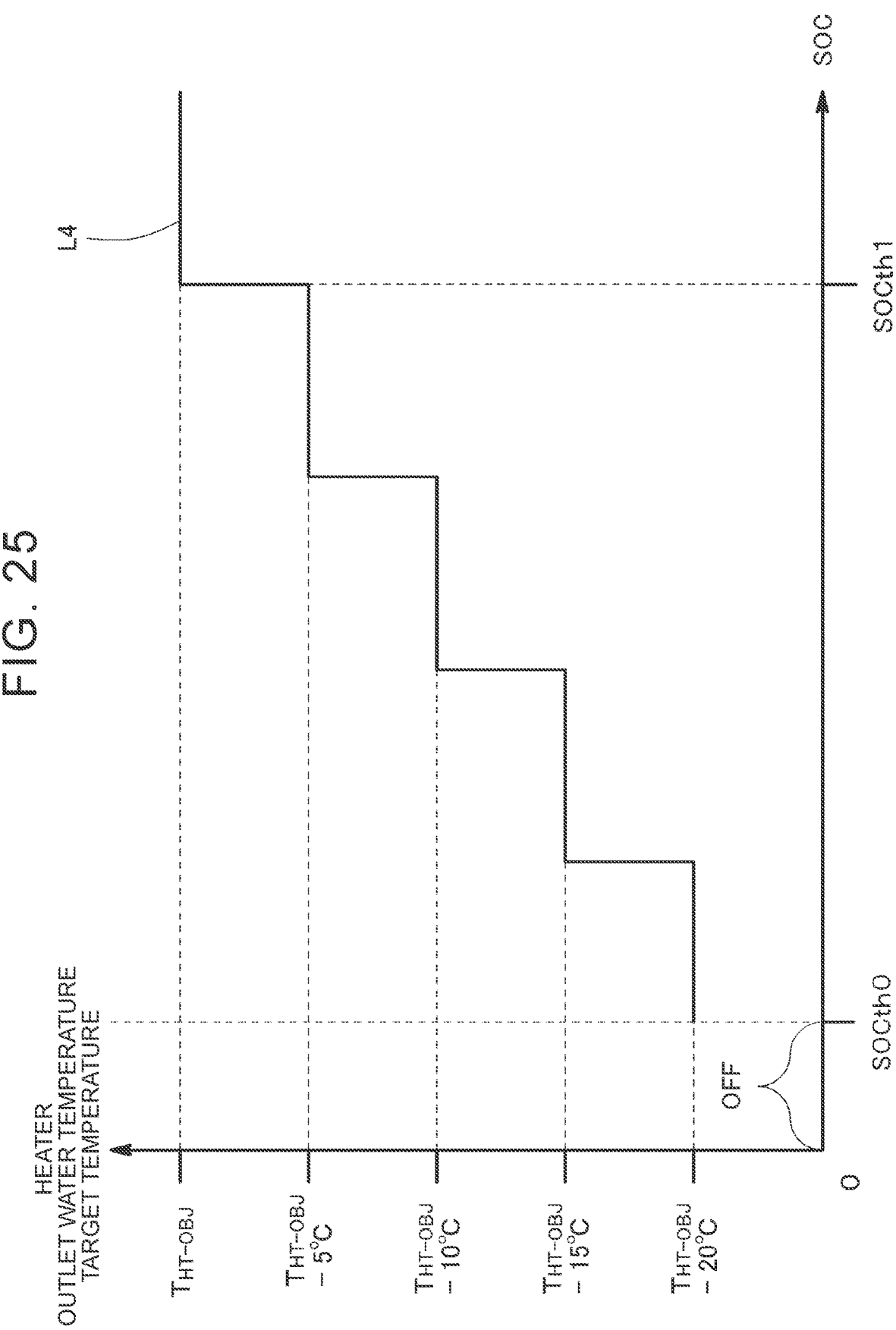

VEHICLE POWER MANAGEMENT SYSTEM

CROSS-REFERENCE TO RELATED APPLICATION

This application claims priority to Japanese Patent Application No. 2021-184466 filed on Nov. 12, 2021, incorporated herein by reference in its entirety.

BACKGROUND

1. Technical Field

The present specification discloses a vehicle power management system capable of managing a state of charge (SOC) of an on-board battery through control of an air conditioner during external power supply.

2. Description of Related Art

The air conditioner mounted on a vehicle is provided with a compressor for compressing a refrigerant. In a conventional on-board air conditioning system, the compressor is driven by an internal combustion engine. On the other hand, in a hybrid electric vehicle (HEV), a plug-in hybrid electric vehicle (PHEV), a battery electric vehicle (BEV), and a fuel cell electric vehicle (FCEV), each of which has a rotating electric machine as a driving source, a large-capacity battery is mounted as a power source. Therefore, in each of these vehicles, an electric compressor driven by the power of the on-board battery may be used.

By using the electric compressor, for example, as in the conventional vehicle, it is not necessary to drive the internal combustion engine when an air conditioning function is used. Therefore, for example, even in an ignition-off state, which is a state in which a vehicle cannot travel, the air conditioning function can be used.

Further, the plug-in hybrid electric vehicle or the battery electric vehicle enables, in the above ignition-off state, external power supply in which the power of the on-board battery is supplied to an external electric device. The external power supply allows, for example, use of the electric device (for example, cooking appliances) at a campsite, an evacuation site, and the like.

When the external power supply and the air conditioning function are used at the same time, there is a possibility that the state of charge (SOC) indicating a charge state of the battery suddenly decreases. Therefore, for example, in Japanese Unexamined Patent Application Publication No. 2016-107910 (JP 2016-107910 A), an operation is controlled during the external power supply such that the air conditioner operates in a power saving mode.

SUMMARY

By the way, there is a possibility that comfort of an occupant deteriorates when an operation of an air conditioning function is uniformly restricted during external power supply. Therefore, the present specification discloses a vehicle power management system capable of improving the comfort of the occupant as compared with the conventional technique, regarding the air conditioning function during the external power supply.

A vehicle power management system disclosed in the present specification includes a battery installed in a vehicle, an air conditioner for a vehicle cabin, the air conditioner being driven by power of the battery, an external power supply device that enables external power supply in which the power of the battery is supplied to an external electric device, and a determination unit that determines whether an operation restriction of the air conditioner is executed during the external power supply. The determination unit determines that the operation restriction is executed when all of following four conditions are satisfied, regarding a cooling operation state of the air conditioner, as determination of whether the operation restriction is executed: (A-1) a target blowout temperature is less than a predetermined blowout threshold temperature during cooling; (A-2) an outside air temperature exceeds a predetermined outside air threshold temperature during cooling; (A-3) a refrigerant temperature after heat is exchanged with an air blown into the vehicle cabin exceeds a predetermined refrigerant threshold temperature during cooling; and (A-4) a blower air volume of the air conditioner exceeds a predetermined threshold air volume.

According to the above configuration, the operation restriction of the air conditioner is executed only in a so-called strong cooling state, which is when any of the conditions (A-1) to (A-4) of the target blowout temperature, the outside air temperature, the refrigerant temperature after the heat is exchanged with the air, and the blower air volume is satisfied.

A vehicle power management system disclosed in the present specification also includes a battery installed in a vehicle, an air conditioner for a vehicle cabin, the air conditioner being driven by power of the battery, an external power supply device that enables external power supply in which the power of the battery is supplied to an external electric device, and a determination unit that determines whether an operation restriction of the air conditioner is executed during the external power supply. The determination unit determines that the operation restriction is executed when all of following four conditions are satisfied, regarding a heating operation state of the air conditioner, as determination of whether the operation restriction is executed: (B-1) a target blowout temperature exceeds a predetermined blowout threshold temperature during heating; (B-2) an outside air temperature is less than a predetermined outside air threshold temperature during heating; (B-3) a refrigerant temperature after heat is exchanged with an air blown into the vehicle cabin is less than a predetermined refrigerant threshold temperature during heating; and (B-4) a blower air volume of the air conditioner exceeds a predetermined threshold air volume.

According to the above configuration, the operation restriction of the air conditioner is executed only in a so-called strong heating state, which is when any of the conditions (B-1) to (B-4) of the target blowout temperature, the outside air temperature, the refrigerant temperature after the heat is exchanged with the air, and the blower air volume is satisfied.

In the above configuration, the determination unit may determine whether the operation restriction is executed when a state of charge of the battery is less than a predetermined battery determination threshold.

According to the above configuration, it is possible to suppress an excessive decrease in the state of charge of the battery by execution of the operation restriction.

Further, in the above configuration, when the determination unit outputs determination for executing the operation restriction, the air conditioner may close an outside air introduction port for an entire period in which the operation restriction is executed.

According to the above configuration, an air conditioning operation is performed by inside air circulation for the entire period in which the operation restriction is executed. Circulating the heated or cooled inside air by the air conditioner compensates for reduced air conditioning capacity due to the operation restriction.

Further, in the above configuration, when the determination unit outputs determination for executing the operation restriction, the air conditioner may invalidate an outside air introduction command by an input operation from an air conditioning operation panel inside the vehicle for an entire period in which the operation restriction is executed.

According to the above configuration, when the outside air introduction command by an occupant inside the vehicle is invalidated, it is possible to maintain circulation of the inside air for the entire period in which the operation restriction is executed.

With the vehicle power management system according to the present specification, regarding the air conditioning function during the external power supply, it is possible to improve the comfort of the occupant as compared with the conventional technique.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 25 is a diagram illustrating a heater outlet water temperature limit map in another example of an air conditioner.

DETAILED DESCRIPTION OF EMBODIMENTS

Figure 1:
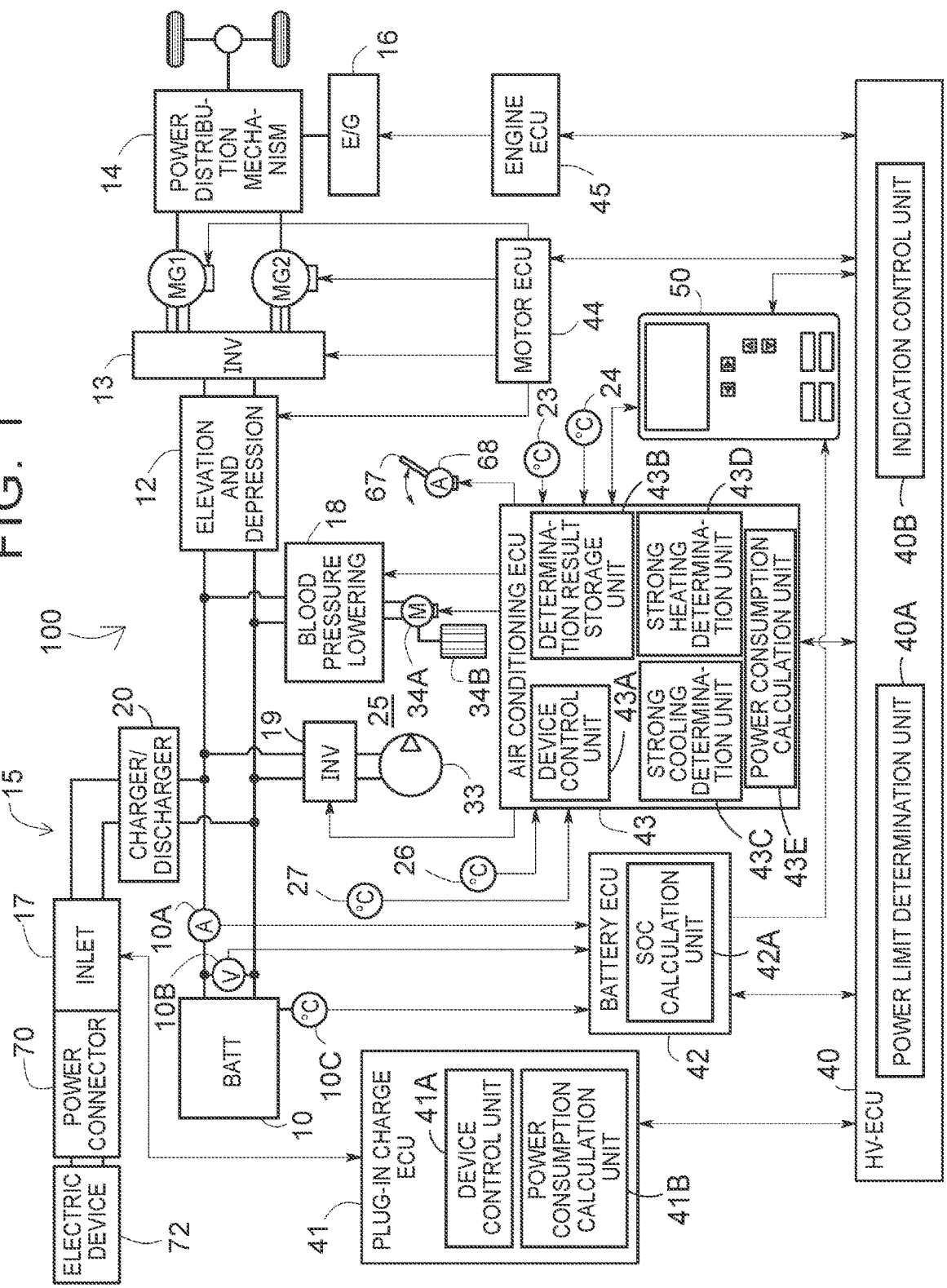
FIG. 1 is a diagram illustrating a configuration of a vehicle in which the vehicle power management system according to the present embodiment is mounted.

FIG. 1 illustrates an overall configuration of a vehicle 100 including a vehicle power management system according to the present embodiment. The vehicle 100 includes, for example, an internal combustion engine 16 and a rotary electric machine MG1, MG2 as a driving source. The vehicle 100 may be a plug-in hybrid electric vehicle (PHEV) capable of external charging and external power supply. The vehicle 100 includes an elevation and depression unit 12, and an inverter 13, and a power distribution mechanism 14.

However, the vehicle 100 is not limited to a plug-in hybrid electric vehicle. In short, when the vehicle is not in operation (at the time of the ignition-off state), the vehicle 100, both the air conditioning function and the external power supply may be a vehicle available. For example, the vehicle 100 includes a rotary electric machine as a driving source. The vehicle 100 may also be a hybrid electric vehicle (HEV), and a battery electric vehicle (BEV), comprising a battery 10 as a power source. The vehicle 100 also includes a current sensor 10A, a voltage sensor 10B, and a temperature sensor 10C.

The battery 10 mounted on the vehicle 100 is composed of, for example, a nickel-metal hydride battery, a lithium-ion battery, and an all-solid-state battery. For example, the capacity of the battery 10 may be 5 kWh or more and 100 kWh or less.

As will be described in more detail below, the vehicular power management system according to the present embodiment is configured to include a battery 10, an air conditioner 25, an external charging/power supply device 15, an HV-ECU 40, and an air conditioning ECU 43.

In the operation restriction executability determination flow shown in FIG. 6, which will be described later, HV-ECU 40 and the air-conditioning ECU 43 share and process the respective steps of the determination flow. Therefore, in the executability determination flow, both HV-ECU 40 and the air-conditioning ECU 43 collectively function as a determination unit.

<External Charging/Power Supply>

Figure 2:
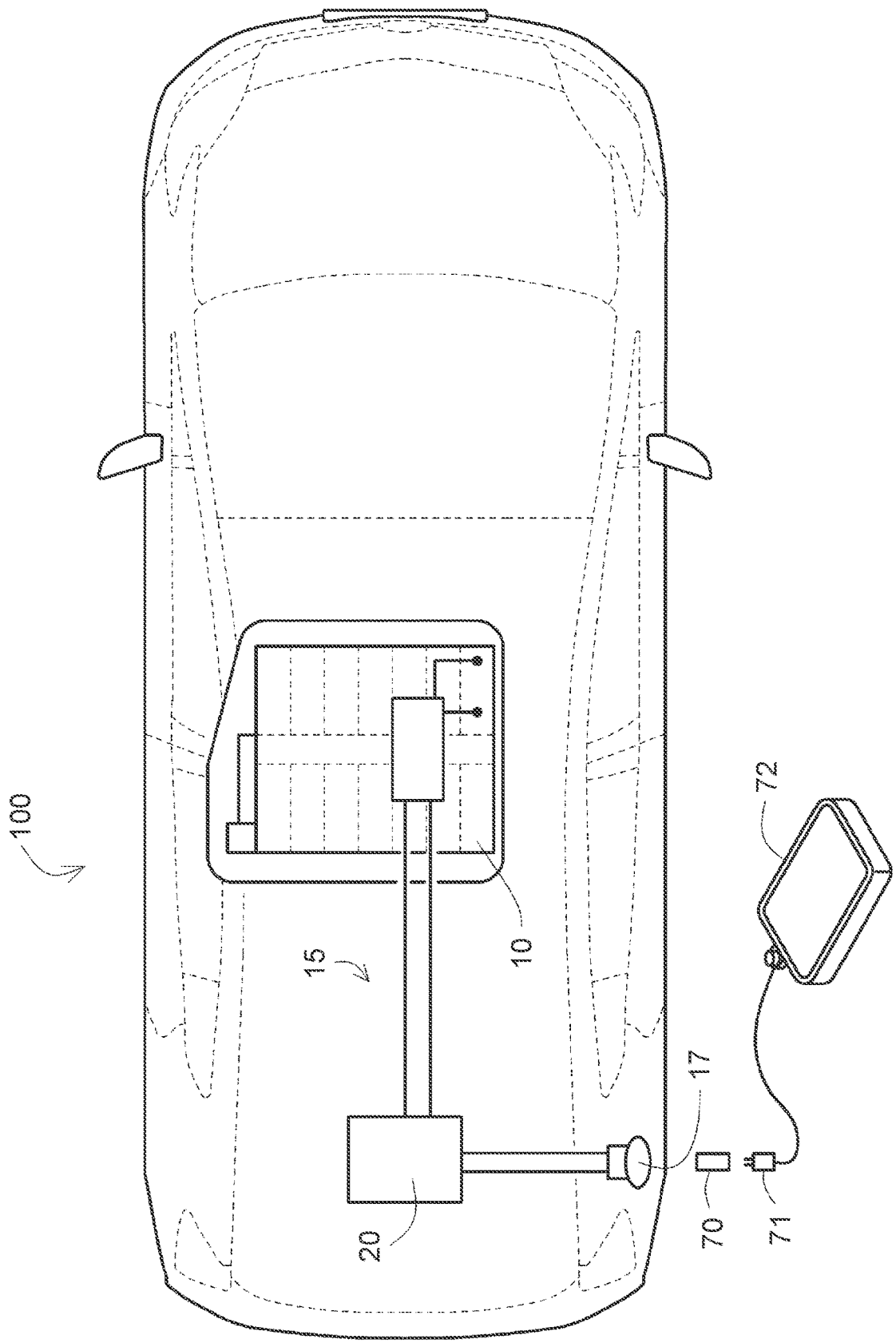
FIG. 2 is a diagram for explaining an external charging/power supply mechanism.

Referring to FIGS. 1 and 2, the external charging/power supply device 15 is configured to include an inlet 17, a charger/discharger 20, a power connector 70, and a plug-in charge ECU 41.

The vehicle 100 is capable of so-called plug-in charging, in which the battery 10 can be charged from a power supply outside the vehicle via an external charging/power supply device 15. Referring to FIG. 2, the inlet 17 provided on the side surface of the vehicle 100 (may be front), by inserting the plug of the external power supply (not shown), it is possible to charge the battery 10. Specifically, the AC power of the external power source is converted into DC power inverter built in the charger/discharger 20, the battery 10 is charged.

Furthermore, the external charging/power supply device 15 supplies power of the battery 10 to the electric device 72 outside the vehicle, it is possible to external power supply. The plug of the power connector 70 is plugged into the inlet 17 upon external power supply. By inserting the power connector 70 into the inlet 17, the plug-in charge ECU 41 recognizes that the latter of the external charging/external power supply has been selected.

The power connector 70, an inlet (not shown) is provided, the plug 71 of the electric device 72 is inserted into the inlet.

When the electric device 72 is connected to the charger/discharger 20 via the power connector 70, the charger/discharger 20 drives the built-in inverter to convert the DC power of the battery 10 into AC power. As a result, external power can be supplied while the battery 10 is converted into, for example, a 60 Hz AC100 V power source, which consumes up to 1500 W.

Aspects of power utilization of the battery 10 include the so-called EV power supply mode and the HV power supply mode. In the HV-fed mode, when the SOC of the battery 10 decreases, the internal combustion engine 16 (see FIG. 1) is started and the rotating electric MG2 is driven as a generator to charge the battery 10.

On the other hand, in the EV power supply mode, the internal combustion engine 16 is not driven, power is supplied only by the power stored in the battery 10. Further, when the SOC of the battery 10 decreases, the power supply is stopped to suppress deterioration of the battery 10 due to overdischarge.

For example, the EV feed mode is selected in areas with nighttime campsites or idling stop ordinances, and where the fuel of the vehicle 100 is less than or equal to a predetermined threshold amount. In addition, in a battery electric vehicle (BEV) in which an internal combustion engine is not mounted on the vehicle 100, exclusively, the EV power supply mode is set.

<Air Conditioner>

Figure 3:
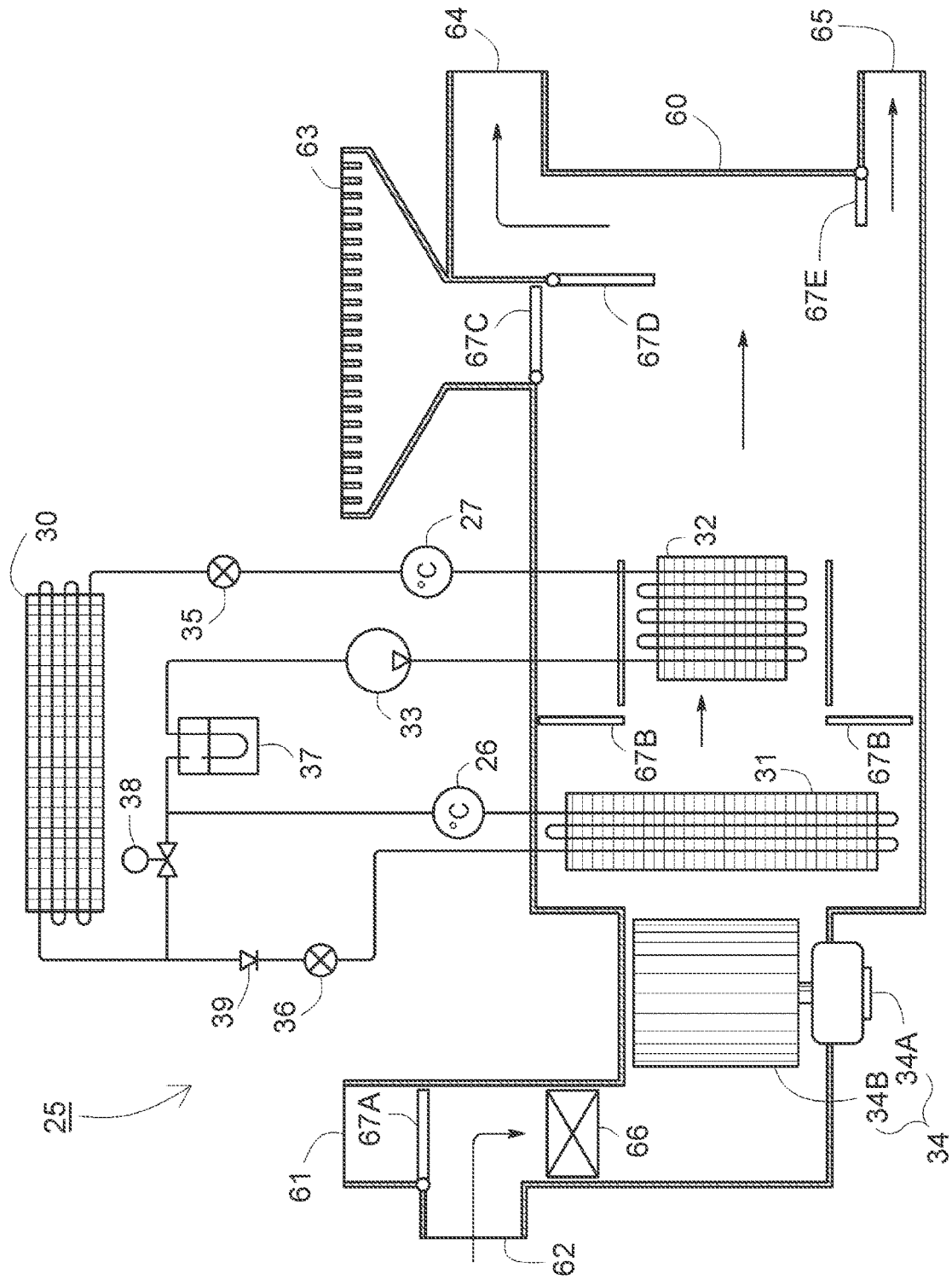
FIG. 3 is a diagram for explaining an air conditioner.

Referring to FIGS. 1 and 3, the air conditioner 25 includes, as an electric device, a step-down DC/DC converter 18, an inverter 19, a compressor 33, a blower motor 34A, and an actuator 68. Further, with reference to FIG. 3, the air conditioner 25, as equipment provided on the flow path of the refrigerant in addition to the compressor 33, the outdoor condenser 30, the evaporator 31, the indoor condenser 32, the expansion valve 35 and 36, the accumulator 37, the solenoid valve 38, and a check valve 39. In addition, the air conditioner 25 includes, as a control system equipment, an air conditioning ECU 43 and the air conditioning operation panel 50.

Referring to FIG. 3, the air conditioner 25 for the vehicle cabin is an air conditioner of the so-called heat pump type. Equipment of the air conditioner 25, including a compressor 33, a blower 34, and an actuator 68 (see FIG. 1), is driven by receiving power from the battery 10.

As illustrated in FIG. 3, the blower 34 includes a blower motor 34A and a blower fan 34B. The blower motor 34A may be, for example, a dc motor. The rotational speed of the blower motor 34A increases as the applied voltage rises. The blower motor 34A is powered from the battery 10 via step-down DC/DC converters 18. Drive signal defining the on/off of the switching element of the step-down DC/DC converter 18 (e.g., PWM signal) is generated by the device control unit 43A of the air conditioning ECU 43. The step-down rate is determined based on the duty ratio in the drive signal to the step-down DC/DC converter 18, the rotational speed of the blower motor 34A and the blower fan 34B is determined accordingly.

The compressor 33 is, for example, an electric type with a built-in motor, and power is supplied from the battery 10 via an inverter 19, as illustrated in FIG. 1. Drive signal defining the on/off of the switching element of the inverter 19 (e.g., PWM signal) is generated by the device control unit 43A of the air conditioning ECU 43. The rotational speed of the compressor 33 is determined based on the duty ratio of the drive signal.

Conventionally, by the compressor 33 which has been driven by an internal combustion engine becomes an electric type such as a motor-driven type, a large power for obtaining the driving torque of the compressor 33 is required. For example, as an electric device high power is required in the vehicle 100, a rotary electric machine MG1, MG2 is a driving source, the compressor 33 consumes power of the second order. For example, while the power consumption of an audio or navigation system, etc. is in watts [W], the power consumption of the compressor 33 is in kilowatts [kW].

The air conditioner 25, the duct 60 for controlling the air flow (see FIG. 3) is provided. The upstream end of the duct 60, the inside air introduction port 61 and the outside air introduction port 62 is provided. The inside air introduction port 61 is disposed in the vehicle cabin. Outside air introduction port 62 is exposed to the outside of the vehicle. Mixing ratio of the inside air and outside air taken into the duct 60 is determined according to the set angle of the inside and outside air switching door 67A.

Air taken in from at least one of the inside air introduction port 61 and the outside air introduction port 62 is sucked by the blower fan 34B, and passes through the evaporator 31 via the air cleaner 66. Furthermore, when the air mix door 67B is blocking the indoor condenser 32 (during cooling), air is sent by bypassing this. Further, air is blown out into the vehicle cabin from at least one of the front defroster duct 63, the face register 64, and the foot register 65. The blowout quantity from the front defroster duct 63, the face register 64, and the foot register 65 is determined according to the opening of the defroster door 67C, the face door 67D, and the foot door 67E.

The inside and outside air switching door 67A, the air mix door 67B, the defroster door 67C, the face door 67D, and the foot door 67E (illustrated as door 67 in FIG. 1) are adjusted opening by an actuator 68 illustrated in FIG. 1. As will be described later, the device control unit 43A of the air conditioning ECU 43 drives the actuator 68 to close the outside air introduction port 62 over the entire duration the operation restriction of the air conditioner 25 is executed. Thus, the air conditioning operation by the internal air circulation over the entire period of the operation restriction of the air conditioner 25 is performed.

Incidentally, the front defroster duct 63, the face register 64, and the temperature of the air conditioning air blown out from the foot register 65 is referred to as the blowout temperature. The target blowout temperature $T_{AO}$, which will be described later, is a target value of this blowing temperature.

The details of operation of the heat pump type air conditioner 25 shall be known. For this reason, it will be briefly described here. When using the heating function of the air conditioner 25, the air mix door 67B is fully opened with respect to the indoor condenser 32. At this time, the refrigerant flows through the circulation path between the compressor 33, the indoor condenser 32, the expansion valve 35, the outdoor condenser 30, the solenoid valve 38, the accumulator 37, and the compressor 33 in this order.

While the refrigerant flows through such a circulation path, air is sent from the blower 34 to the indoor condenser 32. Air passing through the indoor condenser 32 (i.e. heat exchanged) becomes hot air, the front defroster duct 63, the face register 64, and air from at least one of the foot register 65 is blown into the vehicle cabin.

When using the cooling function of the air conditioner 25, the air mix door 67B is fully closed with respect to the indoor condenser 32. At this time, the refrigerant flows through the circulation path between the compressor 33, the indoor condenser 32, the expansion valve 35, the outdoor condenser 30, the expansion valve 36, the evaporator 31, the accumulator 37, and the compressor 33 in this order.

While the refrigerant flows through such a circulation path, air is sent from the blower 34 to the evaporator 31. Air passing through the evaporator 31 (i.e., heat exchanged) becomes cold air, air is blown into the vehicle cabin from at least one of the front defroster duct 63, the face register 64, and the foot register 65.

<Air Conditioning Operation Panel>

Figure 4:
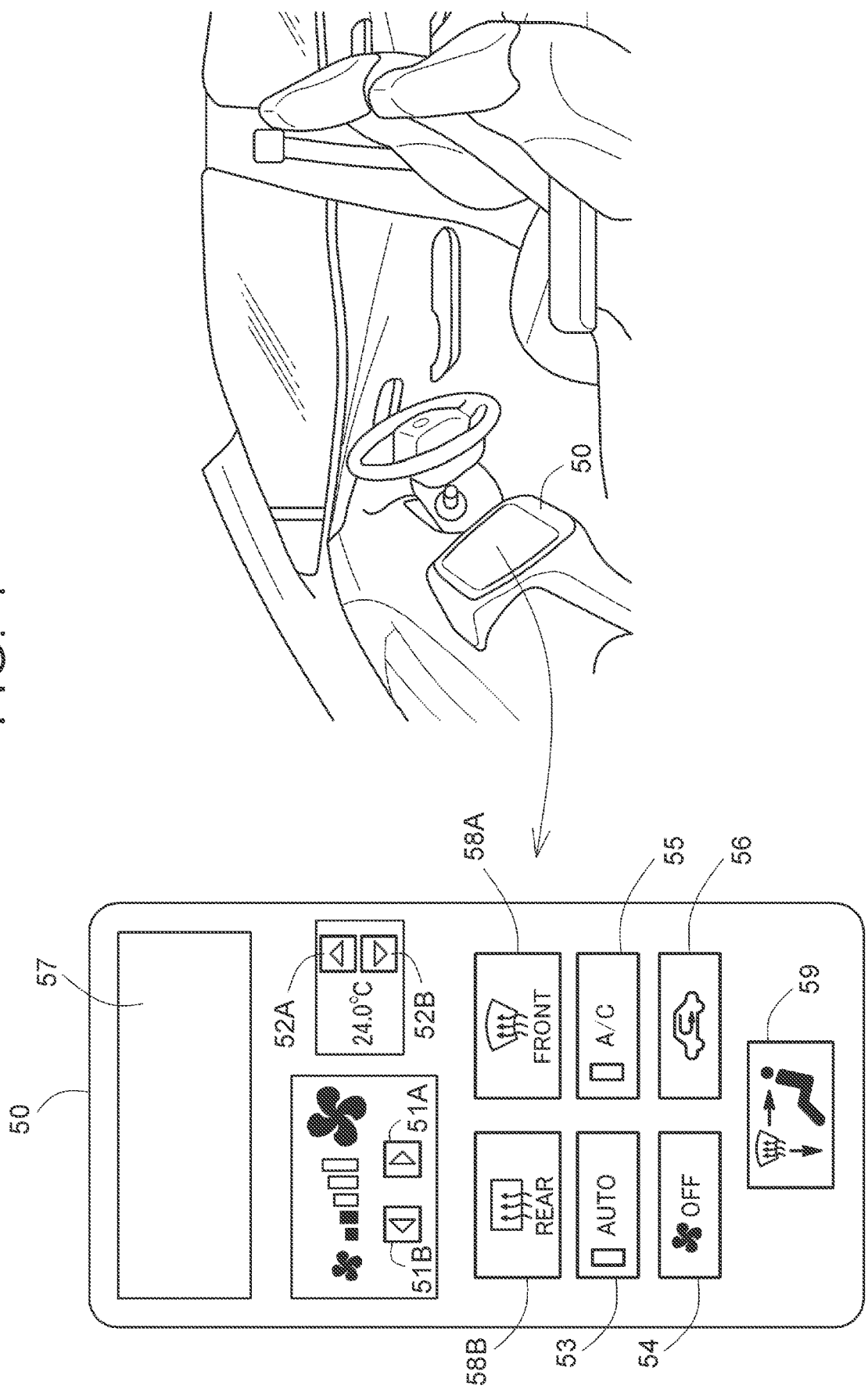
FIG. 4 is a diagram illustrating an air conditioning operation panel for operating the air conditioner.

Referring to FIG. 4, the operating state of the air conditioner 25 is operated by the air conditioning operation panel 50. For example, the air conditioning operation panel 50 is provided on the driver's side of the instrument panel.

The air conditioning operation panel 50 may be, for example, a touch panel in which an input unit and a display unit overlap with each other. The air conditioning operation panel 50, the air volume operation button 51A, 51B, the temperature setting button 52A, 52B, the auto switch 53, and the blower switch 54 is provided. Furthermore, the air conditioning operation panel 50, the air conditioner switch 55, the inside and outside air switching switch 56, the display unit 57, the defroster switch 58A, the rear defogger switch 58B, and the air outlet selection switch 59 is provided. The functions of these buttons and switches are known. Therefore, the description is omitted here as appropriate.

Signals by operating the various switches and buttons of the air conditioning operation panel 50 are transmitted to the air conditioning ECU 43 (air conditioning control unit, see FIG. 1). Device control unit 43A of the air conditioning ECU 43, in accordance with the input content to the air conditioning operation panel 50, to change the control content to the air conditioner 25.

For example, when the inside and outside air switching switch 56 is depressed, the device control unit 43A of the air conditioning ECU 43 is fully opened the inside air introduction port 61 by driving the actuator 68 (see FIG. 3) (outside air introduction port 62 is fully closed). Further, when the inside and outside air switching switch 56 is depressed again, the device control unit 43A of the air conditioning ECU 43, the outside air introduction port 62 is fully opened by driving the actuator 68 (the inside air introduction port 61 is fully closed).

Incidentally, as described later, over the entire period in which the operation restriction for the air conditioner 25 is executed, the device control unit 43A of the air conditioning ECU 43 invalidates the outside air introduction command by the input operation of the inside and outside air switching switch 56.

<Air Conditioning Control>

Referring to FIGS. 1, 3, and 4, the device control unit 43A of the air conditioning ECU 43 receives the input or the like of the various temperature sensors and the air conditioning operation panel 50, and controls the air conditioner 25. The control object of the device control unit 43A includes a compressor 33, a blower 34, and an actuator 68.

For example, the actuator 68, so that the air outlet selected by the air outlet selection switch 59 and the inside and outside air switching switch 56 of the air conditioning operation panel 50 is opened, the device control unit 43A drives and controls the actuator 68.

Further, the compressor 33 and the blower 34, the rotational speed control via the PWM control to the inverter 19 and the step-down DC/DC converter 18 is performed. In setting the rotational speed of the compressor 33 and the blower 34, the device control unit 43A, the set temperature $T_{SET}$ by the operation to the temperature setting button 52A, 52B of the air conditioning operation panel 50, the set air volume $Q_{SET}$ by the operation to the air volume operation button 51A, 51B. Furthermore, the device control unit 43A refers to the outside air temperature $T_{OUT}$ detected by the outside air temperature sensor 23 (see FIG. 1), the in-vehicle temperature $T_{IN}$ detected by the in-vehicle temperature sensor 24. In addition, the device control unit 43A refers to the condenser outlet water temperature $T_{CD}$, which is the refrigerant temperature detected by the condenser outlet water temperature sensor 27 (see FIG. 3), and the evaporator outlet water temperature $T_{EV}$, which is the refrigerant temperature detected by the evaporator outlet water temperature sensor 26.

Further, functions, for example, are stored in the device control unit 43A. This function includes the set temperature $T_{SET}$, the set air volume $Q_{SET}$, the outside air temperature $T_{OUT}$, the in-vehicle temperature $T_{IN}$, the condenser outlet water temperature $T_{CD}$, and the evaporator outlet water temperature $T_{EV}$ in the input items. In addition, this function includes the target blowout temperature $T_{AO}$, the target air volume $Q_{AO}$ and the compressor speed $R_{COMP}$ in the output items.

Qualitatively, when the set temperature $T_{SET}$ is lowered during cooling, or when the outside air temperature $T_{OUT}$, the in-vehicle temperature $T_{IN}$, and the evaporator outlet water temperature $T_{EV}$ are raised, the operation setting for strong cooling is set. At this time, the target blowout temperature $T_{AO}$ is lowered, also the compressor speed $R_{COMP}$ is increased.

On the other hand, when the set temperature $T_{SET}$ is raised, or when the outside air temperature $T_{OUT}$, the in-vehicle temperature $T_{IN}$, and the condenser outlet water temperature $T_{CD}$ are lowered, the operation setting closer to strong heating is set. At this time, the target blowout temperature $T_{AO}$ is raised, also the compressor speed $R_{COMP}$ is raised.

Further, the device control unit 43A sets the blower rotational speed $R_{BL}$ on the basis of the target blowout temperatures $T_{AO}$ and the target air volume $Q_{AO}$ obtained by the above functions. Further, the device control unit 43A sets the opening of the air mix door 67B based on the target blowout temperature $T_{AO}$.

ECU

As illustrated in FIG. 1, the vehicle 100 is provided with a plurality of electronic control units (ECUs). These electronic control units are provided for each function of the vehicle 100, for example. For example, the vehicle 100 includes a plug-in charge ECU 41 that controls the external charging/power supply device 15, and a battery ECU 42 that performs SOCs and power management of the battery 10.

In addition, the vehicle 100 includes an air conditioning ECU 43 for controlling the air conditioner 25, a motor ECU 44 for controlling the rotary electric machine MG1, MG2, and an engine ECU 45 for controlling the internal combustion engine 16. Further, the vehicle 100 includes an HV-ECU 40 as a core ECU, also called a central gateway, which integrates these function-specific ECUs.

The individual function-specific ECUs can communicate with each other via HV-ECU 40. The ECUs for each function and HV-ECU 40 are connected by, for example, signal lines conforming to Controller Area Network (CAN) standard.

Figure 5:
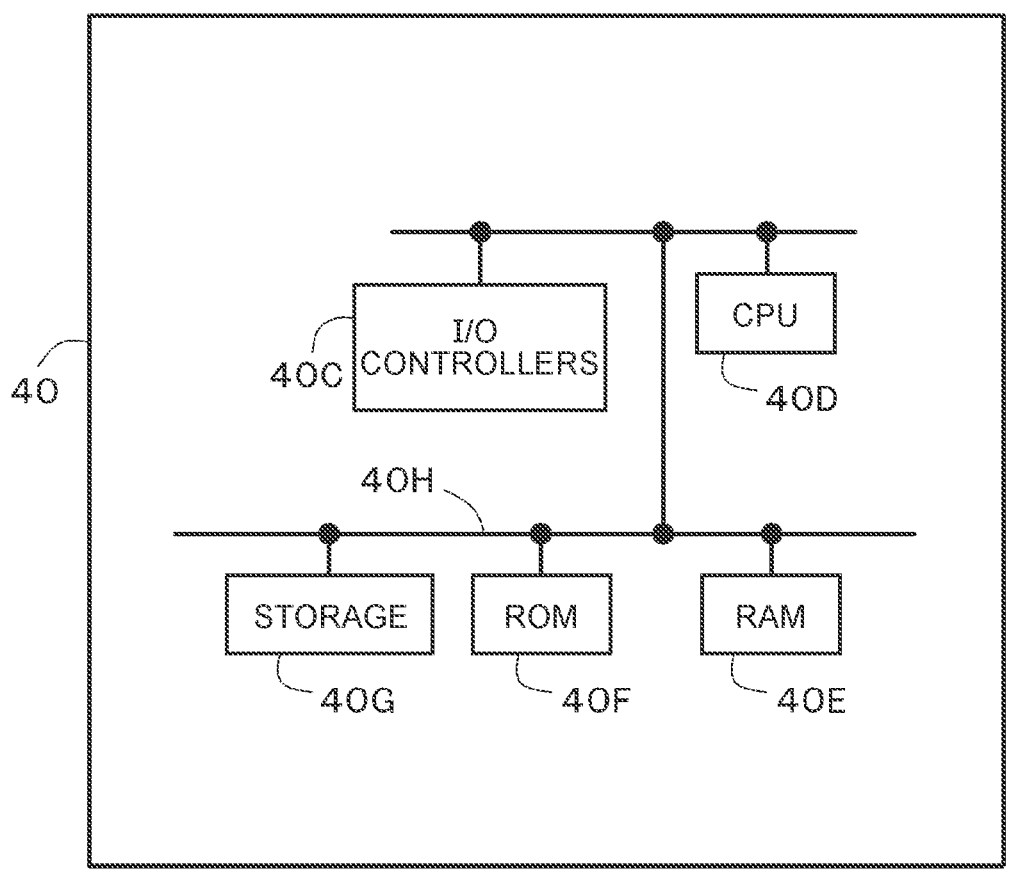
FIG. 5 is a diagram illustrating a hardware configuration of an HV-ECU.

FIG. 5 illustrates a hardware configuration of HV-ECU 40. The other ECUs of the vehicle 100 have the same configuration as in FIG. 5. HV-ECU 40 (and other ECUs) are comprised of, for example, a computer, and include an input/output controller 40C, CPU 40D, RAM 40E, ROM 40F and a storage 40G. These devices can communicate with each other via the internal bus 40H.

Input-output controller 40C receives the signals output from various sensors and other ECUs mounted on the vehicle 100, and outputs a drive command to the in-vehicle device such as an actuator or a lamp. CPU 40D executes calculations on the basis of signals received from the input/output controller 40C, generates a drive command, a protective command for the battery 10, which will be described later, an operation restriction execution command and a restriction release command for the air conditioner 25, and transmits them to the input/output controller 40C. Storage elements such as a RAM 40E, ROM 40F and a storage 40G store control programs, data detected by sensors, and the like.

CPU 40D executes the control programs stored in the storage 40G or the storage ROM 40F to configure the power limit determination unit 40A (see FIG. 1) and the display control unit 40B as functional blocks in HV-ECU 40.

Further, the CPU executes the control programs stored in the storage or ROM of the air conditioning ECU 43, whereby the CPU configures the device control unit 43A, the determination result storage unit 43B, the strong cooling determination unit 43C, the strong heating determination unit 43D, and the power consumption calculation unit 43E as functional blocks in the air conditioning ECU 43.

As will be described later, the power limit determination unit 40A of HV-ECU 40, during the external power supply, to determine whether to execute the operation restriction for the air conditioner 25. Further, the strong cooling determination unit 43C and the strong heating determination unit 43D of the air conditioning ECU 43 executes a sub-process (to be described later) included in the execution availability determination flow of the operation restriction by the power limit determination unit 40A. Therefore, with respect to the execution availability flow of the operation restriction to the air conditioner 25, the power limit determination unit 40A of HV-ECU 40 and the strong cooling determination unit 43C and the strong heating determination unit 43D of the air conditioning ECU 43 functions as an integral determination unit in cooperation.

Figure 10:
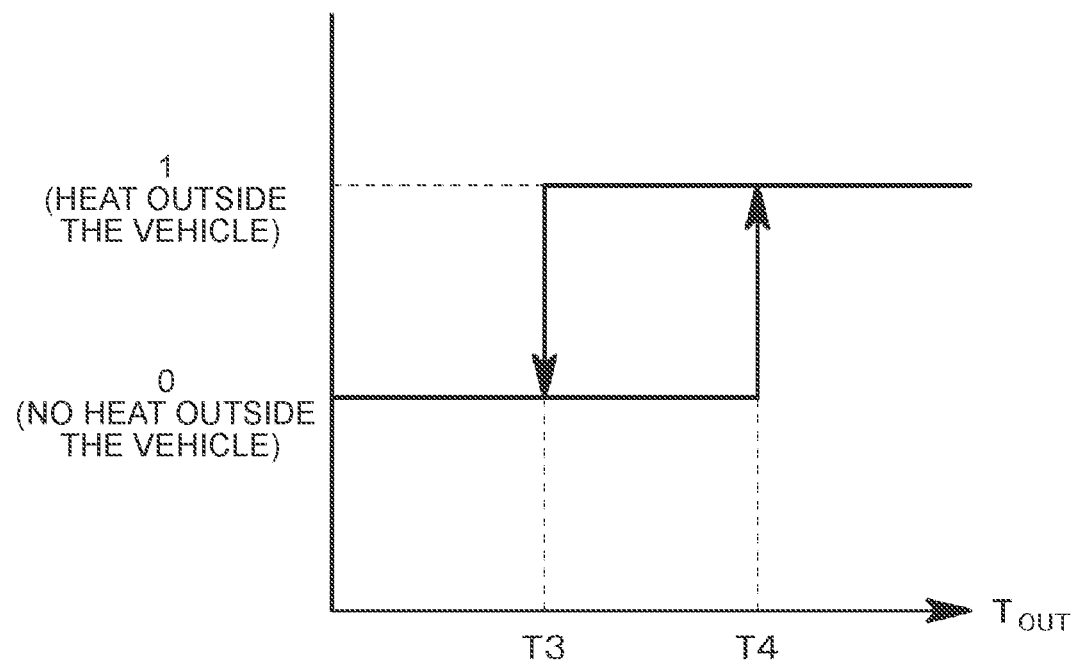
FIG. 10 is a diagram illustrating an outside air temperature map during cooling.
Figure 11:
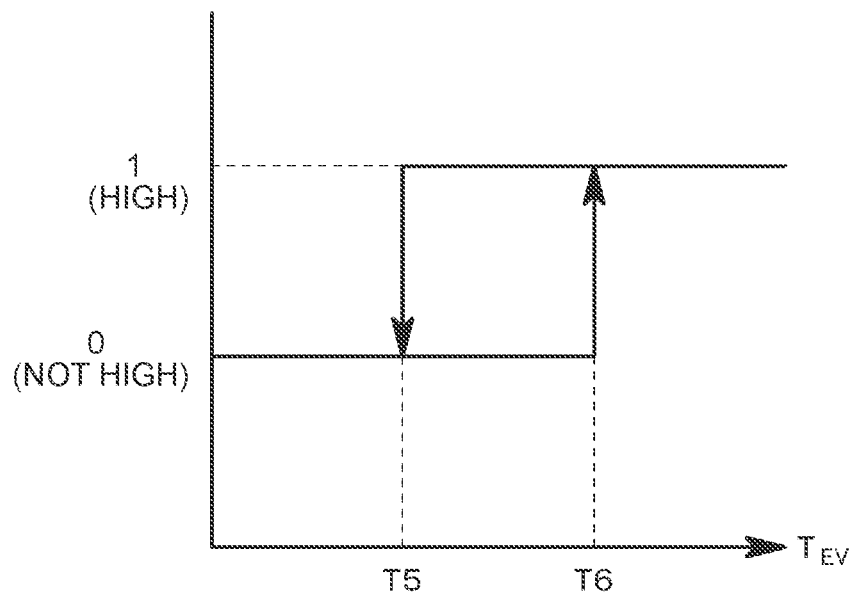
FIG. 11 is a diagram illustrating an evaporator outlet water temperature map during cooling.
Figure 12:
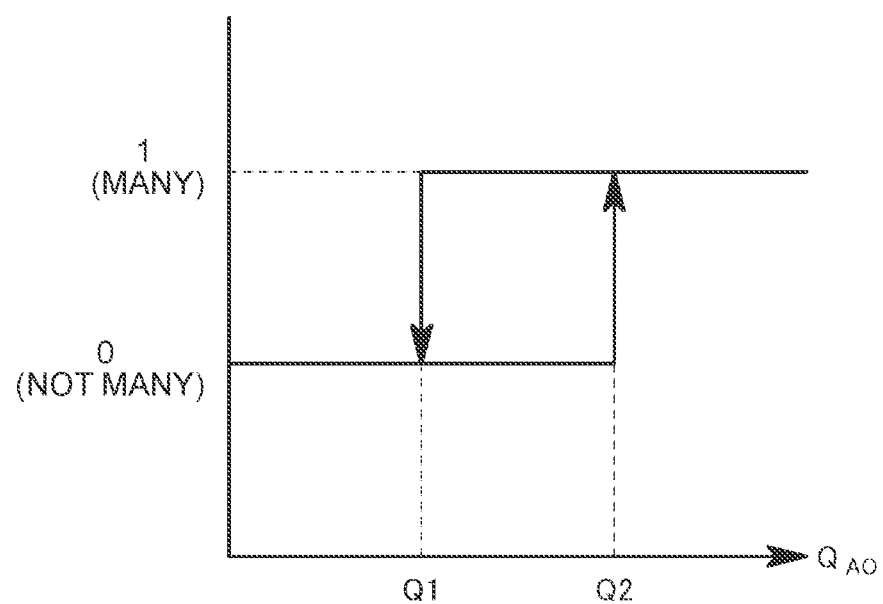
FIG. 12 is a diagram illustrating a blower air volume map.

The strong cooling determination unit 43C, the target blowout temperature map to be described later (FIG. 9), the outside air temperature map (FIG. 10), the evaporator outlet water temperature map (FIG. 11), and the blower air volume map (FIG. 12) is stored. The strong heating determination unit 43D, the target blowout temperature map (FIG. 15), the outside air temperature map (FIG. 16), the condenser outlet water temperature map (FIG. 17), and the blower air volume map described above (FIG. 12) is stored.

The determination result storage unit 43B stores flag values derived from various maps by the strong cooling determination unit 43C and the strong heating determination unit 43D. This flag value can be either 0 or 1. Further, a rotational speed limit map (FIG. 18), an evaporator outlet water temperature limit map (FIG. 19), and a condenser outlet water temperature limit map (FIG. 20), which will be described later, are stored in the device control unit 43A.

Power consumption calculation unit 43E calculates the power consumption of the air conditioner 25 is a control target. For example, based on a command signal to the inverter 19 for supplying driving power to the compressor 33 (e.g., PWM signal), the power consumption calculation unit 43E calculates the power consumption by the compressor 33. Further, the power consumption calculation unit 43E calculates the power consumption by the blower motor 34A based on a command signal (for example, a PWM signal) to the step-down DC/DC converter 18 for supplying the driving power to the blower motor 34A. These calculated power consumption value is transmitted to the power limit determination unit 40A of HV-ECU 40.

Referring to FIG. 1, the plug-in charge ECU 41 functions as an external power supply device that controls the external power supply. When the CPU executes the control programs stored in the ROM or the storage of the plug-in charge ECU 41, the CPU configures the device control unit 41A and the power-consumption calculating unit 41B in the plug-in charge ECU 41.

The power consumption calculating unit 41B calculates the external power supply [W] fed from the inlet 17 to the electric device 72 outside the vehicle, and transmits the power value to the power limit determination unit 40A of HV-ECU 40.

The device control unit 41A controls the external charging power/external feeding power by the external charging/power supply device 15. For example, the device control unit 41A permits the external power supply only in the ignition-off state in which the vehicle 100 is in the non-traveling condition. Further, for example, when there is a possibility that the SOC of the battery 10 is lowered leads to over-discharge, the device control unit 41A receives a protective command from the power limit determination unit 40A of HV-ECU 40. In response to this, the device control unit 41A switches the external power supply relay (not shown) connecting the inlet 17 and the battery 10 from the connected state to the disconnected state to stop the operation of the external charging/power supply device 15.

The battery ECU 42 monitors and protects the battery 10. The control programs stored in the ROMs or storages of the battery ECU 42 are executed by the CPUs, whereby the SOC calculation unit 42A is configured in the battery ECU 42. The SOC calculation unit 42A calculates the SOC of the battery 10 and transmits the SOC to HV-ECU 40 power limit determination unit 40A.

In calculating the SOC, the SOC calculation unit 42A measures the current flowing into and out of the battery 10 based on the current value detected from the current sensor 10A connected to the battery 10. Furthermore, the SOC calculation unit 42A estimates the SOC of the battery 10 based on the integrated value (current integrated value).

Further, the battery 10 may occur self-discharge due to chemical reaction or the like therein, SOC is lowered due to this. However, the self-discharge is an internal reaction of the battery and does not involve the inflow or outflow of current to or from the outside. Therefore, even if self-discharge occurs, self-discharge is not reflected in the current accumulated value. As a result, as the self-discharge progresses, the deviation between the estimated value of the SOC based on the integrated current value and the actual SOC increases. Therefore, for example, the SOC calculation unit 42A estimates the SOC based on the open-end voltage value (OCV) of the battery. Based on this, the SOC calculation unit 42A corrects the SOC estimation value based on the current integrated value.

<Determine whether or not to Execute the Operation Restriction>

Figure 6:
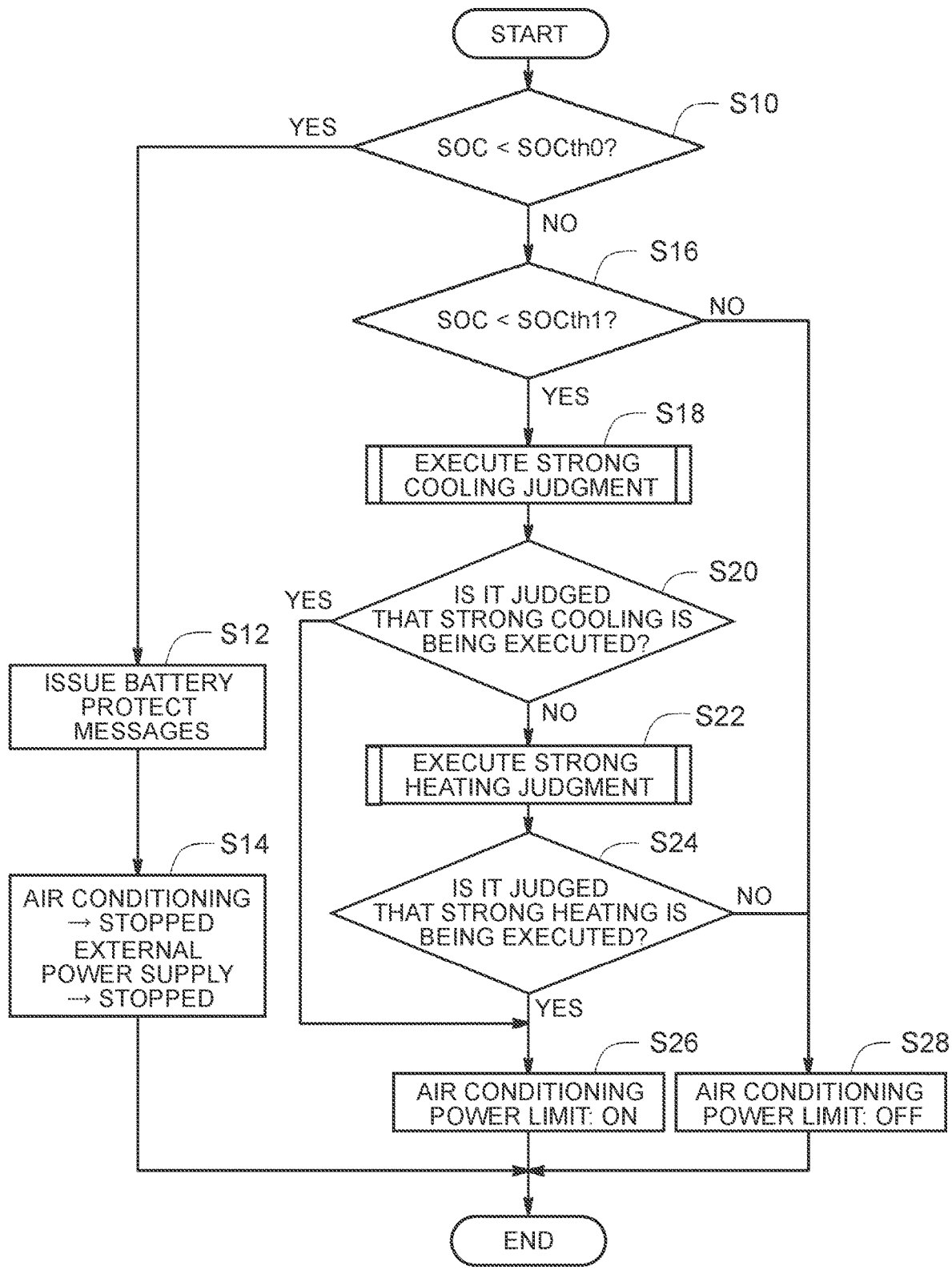
FIG. 6 is a diagram illustrating an execution availability determination flow for the operation restriction of the air conditioner.

FIG. 6 illustrates a flowchart exemplifying the determination of whether to execute the operation restriction of the external power supply and the air conditioner 25. When the vehicle 100 supplies power to an external electric device, this determination flow is repeatedly executed at predetermined time intervals, for example, one minute intervals.

The power limit determination unit 40A of HV-ECU 40 acquires the SOC of the battery 10 from the SOC calculation unit 42A of the battery ECU 42. Further, the power limit determination unit 40A determines whether or not the acquired SOC is less than the predetermined battery protection threshold SOCth0 (S10). The battery protection threshold SOCth0 is set to, for example, 20%.

If the SOC of the battery 10 is less than the battery protection threshold SOCth0, over-discharging may degrade the battery 10. Therefore, HV-ECU 40 stops the external charging/power supply device 15 and the air conditioner 25.

Here, prior to the stop command for the external charging/power supply device 15 and the air conditioner 25 is outputted, the power limit determination unit 40A outputs a warning command to the display control unit 40B. In response to this, the display control unit 40B, the display unit 57 of the air conditioning operation panel 50 (FIG. 4), the message indicating that the external power supply and the air conditioning function is stopped after a predetermined time (e.g., after 3 minutes) (battery protection message) is displayed (S12).

In particular, with respect to the external power supply, the electric device 72 of the power supply destination is a wide variety, there is a possibility that the electric device 72 fails due to a sudden power interruption. Therefore, by notifying the power shutdown to the occupant before the power shutdown, it is possible to prompt the stop operation of the electric device by the occupant.

After a predetermined time has elapsed after the battery protection message is displayed, the power limit determination unit 40A transmits a stop command to stop the operation of the external charging/power supply device 15 to the device control unit 41A of the plug-in charge ECU 41 (S14). Further, in conjunction with this, the power limit determination unit 40A, the device control unit 43A of the air conditioning ECU 43, and transmits a stop command for stopping the operation of the air conditioner 25. Thereafter, the flow of FIG. 6 ends.

Returning to step S10, when the SOC of the battery 10 is equal to or greater than the battery protection threshold SOCth0, the power limit determination unit 40A determines whether or not the SOC of the battery 10 is less than the predetermined battery determination threshold SOCth1 (>SOCth0) (S16). The battery determination threshold SOCth1 may be, for example, 50%.

In S16, if SOC SOCth1, it is determined that the SOC of the battery 10 is adequate. Therefore, the power limit determination unit 40A transmits a limit release command to the device control unit 43A of the air conditioning ECU 43. In response, the device control unit 43A sets off the air conditioning use power limit (S28). Thus, exclusively based on the various switches and button operations of the air conditioning operation panel 50 (see FIG. 4), the device control unit 43A performs operation control of the compressor 33 and the blower 34.

On the other hand, when the SOC of the battery 10 is less than the battery determination threshold SOCth1 in step S16, the power limit determination unit 40A outputs an execution command of the strong cooling determination flow (see FIGS. 7 and 8) to the strong cooling determination unit 43C of the air conditioning ECU 43 (S18).

The strong cooling determination flow is a sub process of the executability determination flow of FIG. 6. Although the flow of the strong cooling determination will be described in detail later, in the flow, when all of the following four conditions (A-1)-(A-4) are satisfied with respect to the cooling operation state of the air conditioner 25, the strong cooling determination unit 43C determines that the air conditioner 25 is executing strong cooling. On the other hand, when at least one of the following four conditions is not satisfied, the strong cooling determination unit 43C determines that strong cooling is not executed.

(A-1) Target blowout temperature $T_{AO}$ is less than the predetermined cooling blowout threshold temperature $*T_{AO\text{-}C/D}$ (the blowout temperature is set low because the vehicle is hot).

(A-2) Outside temperature $T_{OUT}$ exceeds the specified threshold temperature $*T_{OUT\text{-}C/D}$ for cooling (outside is hot)

(A-3) Refrigerant temperature after heat exchange with air blown into the vehicle cabin, i.e. evaporator outlet water temperature $T_{EV}$ exceeds a predetermined refrigerant threshold temperature during cooling $*T_{EV\text{-}C/D}$ (heat exchange quantity is large)

(A-4) The target air volume $Q_{AO}$ of the blower 34 exceeds the predetermined threshold air volume $*Q_{AO}$ (the air volume of the air conditioner is large).

The power limit determination unit 40A determines whether or not the determination result by the strong cooling determination unit 43C is performing strong cooling, confirms (S20). When it is determined that the air conditioner 25 is executing the strong cooling, the power limit determination unit 40A determines that the operation restriction is to be executed in step S26. Details of the operation restriction will be described later.

At step S20, when the cooling state of the air conditioner 25 is determined by the strong cooling determination unit 43C is not strong cooling, the power limit determination unit 40A of HV-ECU 40, the strong heating determination unit 43D of the air conditioning ECU 43, the strong heating determination flow (see FIGS. 13 and 14) to output an execution command (S22).

Details of the strong heating determination flow will be described later. In this flowchart, when all of the following four conditions (B-1)-(B-4) are satisfied with respect to the heating operation state of the air conditioner 25, the strong heating determination unit 43D determines that the air conditioner 25 is performing strong heating. On the other hand, when at least one of the following four conditions is not satisfied, the strong heating determination unit 43D determines that strong heating is not executed.

(B-1) Target blowout temperature $T_{AO}$ exceeds the specified blowout threshold temperature $*T_{AO\text{-}W/U}$ during heating (blowout temperature is set high because the vehicle is cold).

(B-2) Outside temperature $T_{OUT}$ is less than the specified threshold temperature *$T_{OUT-W/U}$ for heating (cold outside)

(B-3) The refrigerant temperature after heat exchange with the air blown into the vehicle cabin, i.e., the condenser outlet water temperature $T_{CD}$, is less than the predetermined threshold temperature *$T_{CD-W/U}$ for heating (heat exchange is large).

(B-4) The target air volume $Q_{AO}$ of the blower 34 exceeds the predetermined threshold air volume *$Q_{AO}$ (the air volume of the air conditioner is large).

The power limit determination unit 40A whether determination by the strong heating determination unit 43D is performing strong heating confirms (S24). When it is determined that the air conditioner 25 is executing strong heating, the power limit determination unit 40A determines that the operation restriction is to be executed in step S26. Details of the operation restriction will be described later.

On the other hand, in the step S24, when the air conditioner 25 is determined not to execute the strong heating, so that both the strong cooling and the strong heating is not executed. Therefore, the power limit determination unit 40A, as the output of the non-execution determination for the drive limit, and transmits a limit release command to the device control unit 43A of the air conditioning ECU 43. In response, the device control unit 43A sets off the air conditioning use power limit (S28).

Thus, the operation restriction of the air conditioner 25, by being effective only when performing strong cooling or strong heating, it is possible to improve the comfort of the occupant than in the prior art.

<Strong Cooling Judgment>

Figure 7:
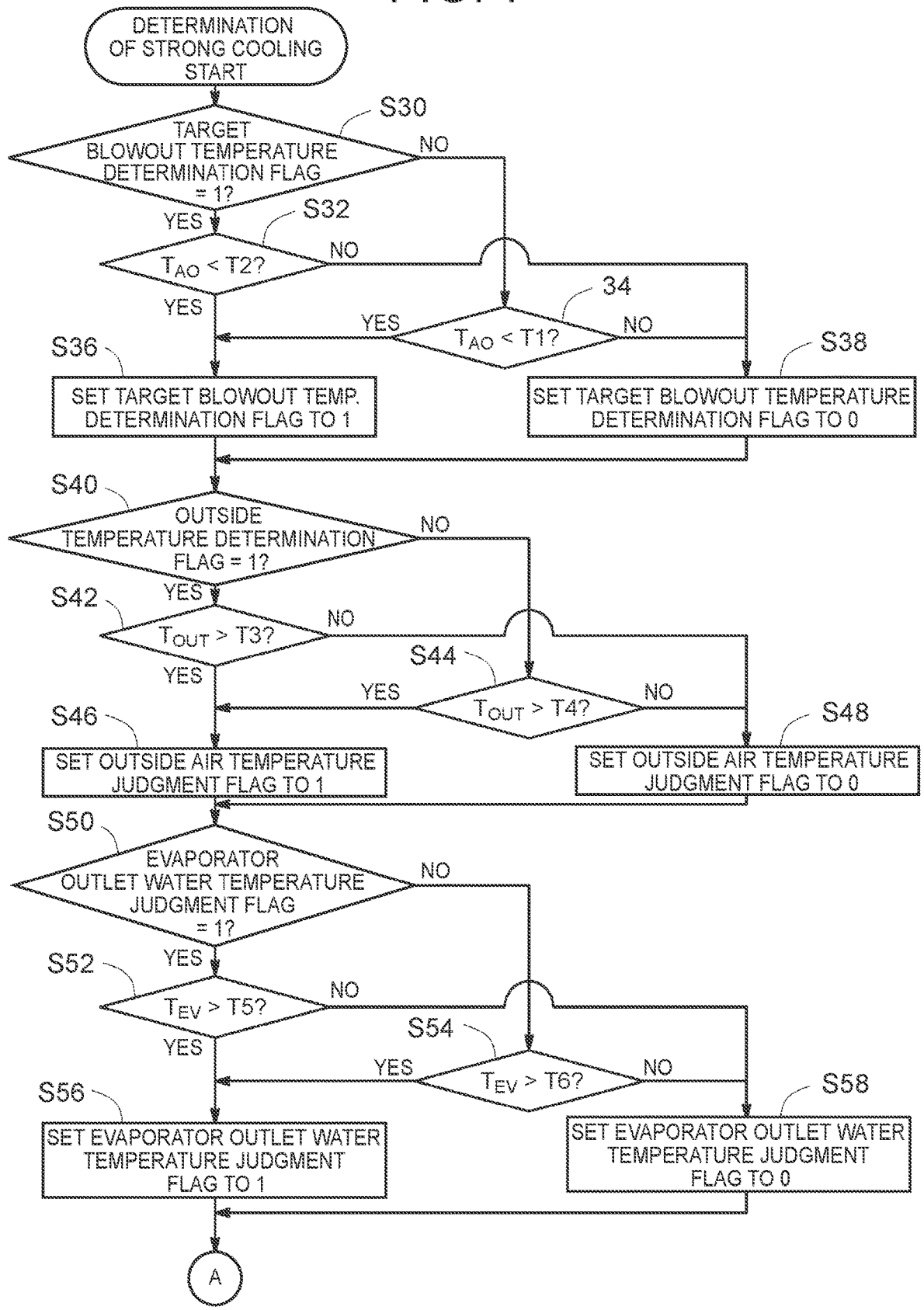
FIG. 7 is a diagram illustrating a strong cooling determination flow (1/2) is a sub-process in the execution availability determination flow.
Figure 8:
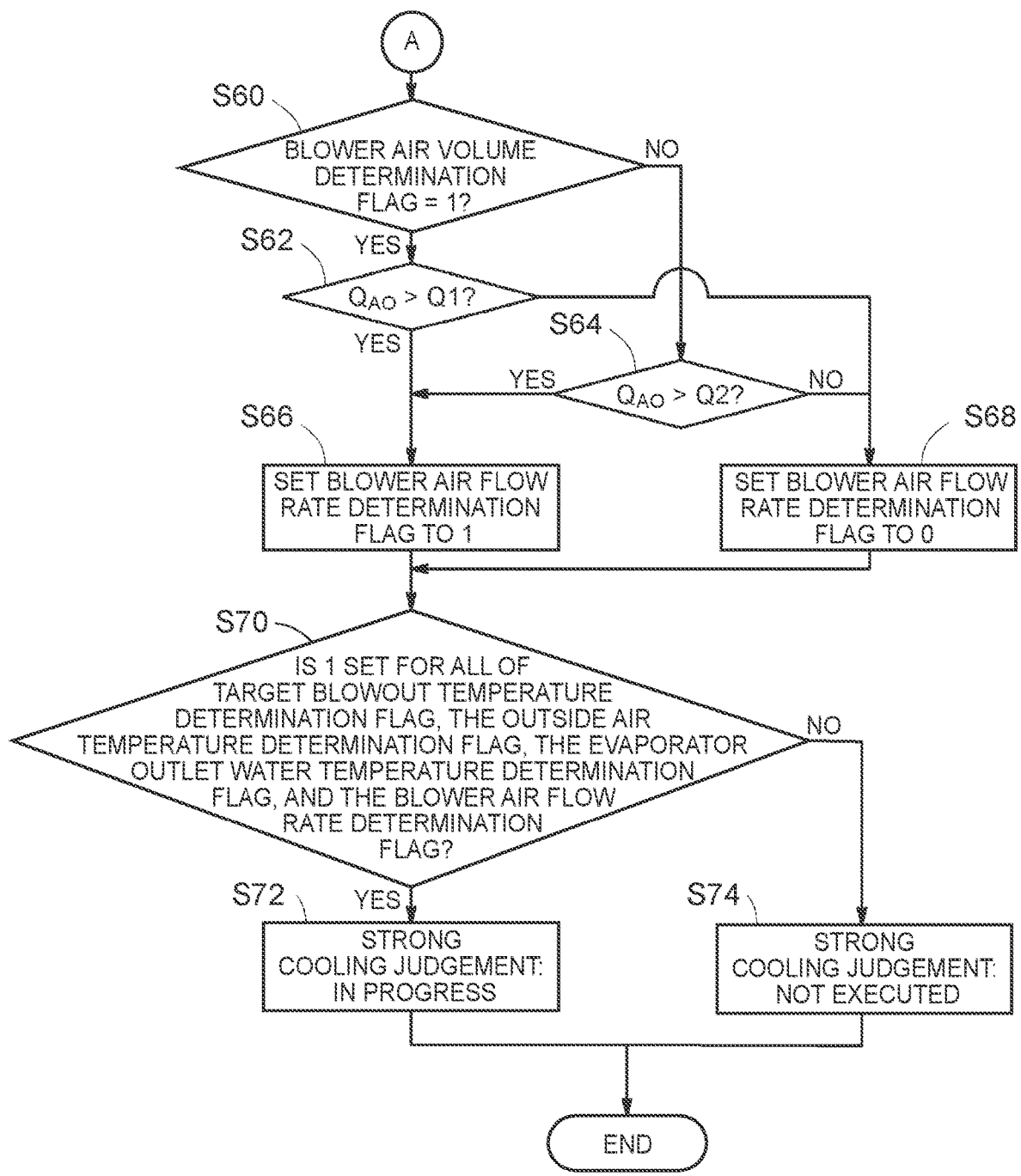
FIG. 8 is a diagram illustrating a strong cooling determination flow (2/2) is a sub-process in the execution availability determination flow.

In FIGS. 7 and 8, the strong cooling determination flow executed by the strong cooling determination unit 43C is exemplified. The strong cooling determination unit 43C calls the previous strong cooling determination result from the determination result storage unit 43B. Then, the strong cooling determination unit 43C whether the flag value of the target blowout temperature determination flag is 1 determines (S30).

Figure 9:
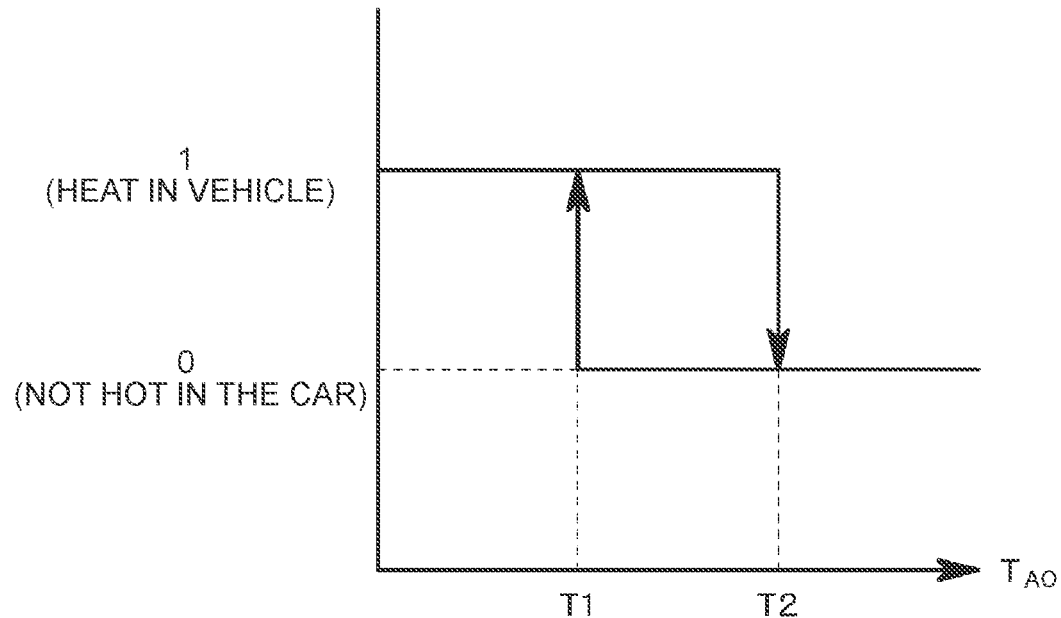
FIG. 9 is a diagram illustrating a target blowout temperature map during cooling.

In FIG. 9, the target blowout temperature map during cooling is exemplified. In this map, the target blowout temperatures $T_{AO}$ are taken on the horizontal axis. In addition, the map takes the flag values 0 and 1 on the vertical axis. The maps exemplified in FIGS. 9 to 12 including this map are stored in, for example, the strong cooling determination unit 43C.

Including this map, in the map used in the strong cooling determination flow and strong heating determination flow (FIGS. 9 to 12 and 15 to 17), hysteresis setting is performed to prevent chattering. That is, the threshold of the lower level and the threshold of the higher level are set as the threshold defining which of the flag value 0, 1 to be taken.

For example, in the cooling time target blowout temperature map of FIG. 9, as the cooling time outlet threshold temperature *$T_{AO-C/D}$, the temperature value T1 and the temperature value T2 (T1<T2) is determined. For example, the temperature value T1 is set to 20° C., and the temperature value T2 is set to 23° C.

When the flag value 1 is output in the previous strong cooling determination, the flag value 1 is output when the present value of the target blowout temperature $T_{AO}$ acquired from the device control unit 43A is less than the temperature value T2. On the other hand, when the flag value is 0 in the previous strong cooling determination, the flag value 1 is outputted when the present value of the target blowout temperature $T_{AO}$ is less than the temperature value T1.

Strong cooling determination unit 43C refers to the previous value of the cooling time target blowout temperature map from the determination result storage unit 43B. In step S30, the strong cooling determination unit 43C determines whether the previous value is 1. When the previous value is 1, the strong cooling determination unit 43C acquires the present value of the target blowout temperature $T_{AO}$ from the device control unit 43A. In step S32, the strong cooling determination unit 43C determines whether the present value is less than the threshold T2. When $T_{AO}$<T2, the strong cooling determination unit 43C sets the value of the target blowout temperature determination flag to 1 (S36). On the other hand, if $T_{AO}$≥T2, the strong cooling determination unit 43C sets the value of the target blowout temperature determination flag to 0 (S38).

Returning to S30, when the previous value is 0, the strong cooling determination unit 43C determines whether or not the present value of the target blowout temperature $T_{AO}$ is less than the threshold T1 (S34). When $T_{AO}$<T1, the strong cooling determination unit 43C sets the value of the target blowout temperature determination flag to 1 (S36). On the other hand, when $T_{AO}$≥T1, the strong cooling determination unit 43C sets the target blowout temperature determination flag to 0 (S38).

Next, the strong cooling determination unit 43C refers to the previous value of the outside air temperature map during cooling (see FIG. 10) from the determination result storage unit 43B. Then, the strong cooling determination unit 43C determines whether or not the previous value (i.e., the determination flag value) is 1 (S40). In this map, the outside air threshold temperatures at the time of cooling *$T_{OUT-C/D}$ are the thresholds T3 and T4 (T3<T4). For example, the temperature value T3 is set to 30° C., and the temperature value T4 is set to 33° C.

When the previous value of the outside air temperature map during cooling is 1, the strong cooling determination unit 43C acquires the present value of the outside air temperature $T_{OUT}$ from the outside air temperature sensor 23. In step S42, the strong cooling determination unit 43C determines whether the present value exceeds the threshold T3. When $T_{OUT}$>T3, the strong cooling determination unit 43C sets the target blowout temperature determination flag to 1 (S46). On the other hand, when $T_{OUT}$≤T3, the strong cooling determination unit 43C sets the value of the outside air temperature determination flag to 0 (S48).

Returning to S40, when the previous value of the target blowout temperature determination flag is 0, the strong cooling determination unit 43C determines whether or not the present value of the outside air temperature Tour exceeds the threshold T4 (S44). When $T_{OUT}$>T4, the strong cooling determination unit 43C sets the target blowout temperature determination flag to 1 (S46). On the other hand, when $T_{OUT}$≤T4, the strong cooling determination unit 43C sets the target blowout temperature determination flag to 0 (S48).

Next, the strong cooling determination unit 43C refers to the previous value of the evaporator outlet water temperature map during cooling (see FIG. 11) from the determination result storage unit 43B. In step S50, the strong cooling determination unit 43C determines whether the previous value is 1. In this map, the cooling-time coolant threshold temperatures *$T_{EV-C/D}$ are the thresholds T5 and T6 (T5<T6). For example, the temperature value T5 is set to 0° C., and the temperature value T6 is set to 3° C.

When the previous value of the evaporator outlet water temperature map at the time of cooling is 1, the strong cooling determination unit 43C acquires the present value of the evaporator outlet water temperature $T_{EV}$ from the evaporator outlet water temperature sensor 26. In step S52, the strong cooling determination unit 43C determines whether the present value exceeds the threshold T5. When $T_{EV}$>T5, the strong cooling determination unit 43C sets the value of the evaporator outlet water temperature determination flag to 1 (S56). On the other hand, when $T_{EV}$T5, the strong cooling determination unit 43C sets the value of the evaporator outlet water temperature determination flag to 0 (S58).

Returning to S50, when the previous value of the evaporator outlet water temperature determination flag is 0, the strong cooling determination unit 43C determines whether or not the present value of the evaporator outlet water temperature $T_{EV}$ exceeds the threshold T6 (S54). When $T_{EV}$>T6, the strong cooling determination unit 43C sets the value of the evaporator outlet water temperature determination flag to 1 (S56). On the other hand, when $T_{EV}$≤T6, the strong cooling determination unit 43C sets the value of the evaporator outlet water temperature determination flag to 0 (S58).

Next, the strong cooling determination unit 43C refers to the previous value of the blower air volume map (see FIG. 12) from the determination result storage unit 43B. In step S60, the strong cooling determination unit 43C determines whether the previous value is 1. Note that in this map, the threshold air volume $*Q_{AO}$ becomes the thresholds Q1 and Q2 (Q1<Q2). For example, the air volume Q1 is set to a value of 80% of the maximum air volume of the blower 34. Furthermore, for example, the air volume Q2 is set to 90% of the maximum air volume of the blower 34.

When the previous value of the blower air volume map is 1, the strong cooling determination unit 43C acquires the present value of the target air volume $Q_{AO}$ of the blower 34 from the device control unit 43A. In step S62, the strong cooling determination unit 43C determines whether the present value exceeds the threshold Q1. If $Q_{AO}$>Q1, the strong cooling determination unit 43C sets the value of the blower air volume determination flag to 1 (S66). On the other hand, if $Q_{AO}$≤Q1, the strong cooling determination unit 43C sets the value of the blower air volume determination flag to 0 (S68).

Returning to S60, when the previous value of the blower air volume determination flag is 0, the strong cooling determination unit 43C determines whether or not the present value of the target air volume $Q_{AO}$ of the blower 34 exceeds the threshold Q2 (S64). If $Q_{AO}$>Q2, the strong cooling determination unit 43C sets the value of the blower air volume determination flag to 1 (S66). On the other hand, if $Q_{AO}$≤Q2, the strong cooling determination unit 43C sets the value of the blower air volume determination flag to 0 (S68).

Further, in step S70, the strong cooling determination unit 43C determines whether or not flag values 1 are set in all of the target blowout temperature determination flag, the outside air temperature determination flag, the evaporator outlet water temperature determination flag, and the blower air volume determination flag. When all four flags are flag value 1, the strong cooling determination unit 43C that the air conditioner 25 is in the strong cooling execution, it is determined (S72). On the other hand, if at least one of the above four flags takes the flag value 0, the air conditioner 25 is strong cooling determination unit 43C and is not executing the strong cooling, it is determined (S74).

<Strong Heating>

Figure 13:
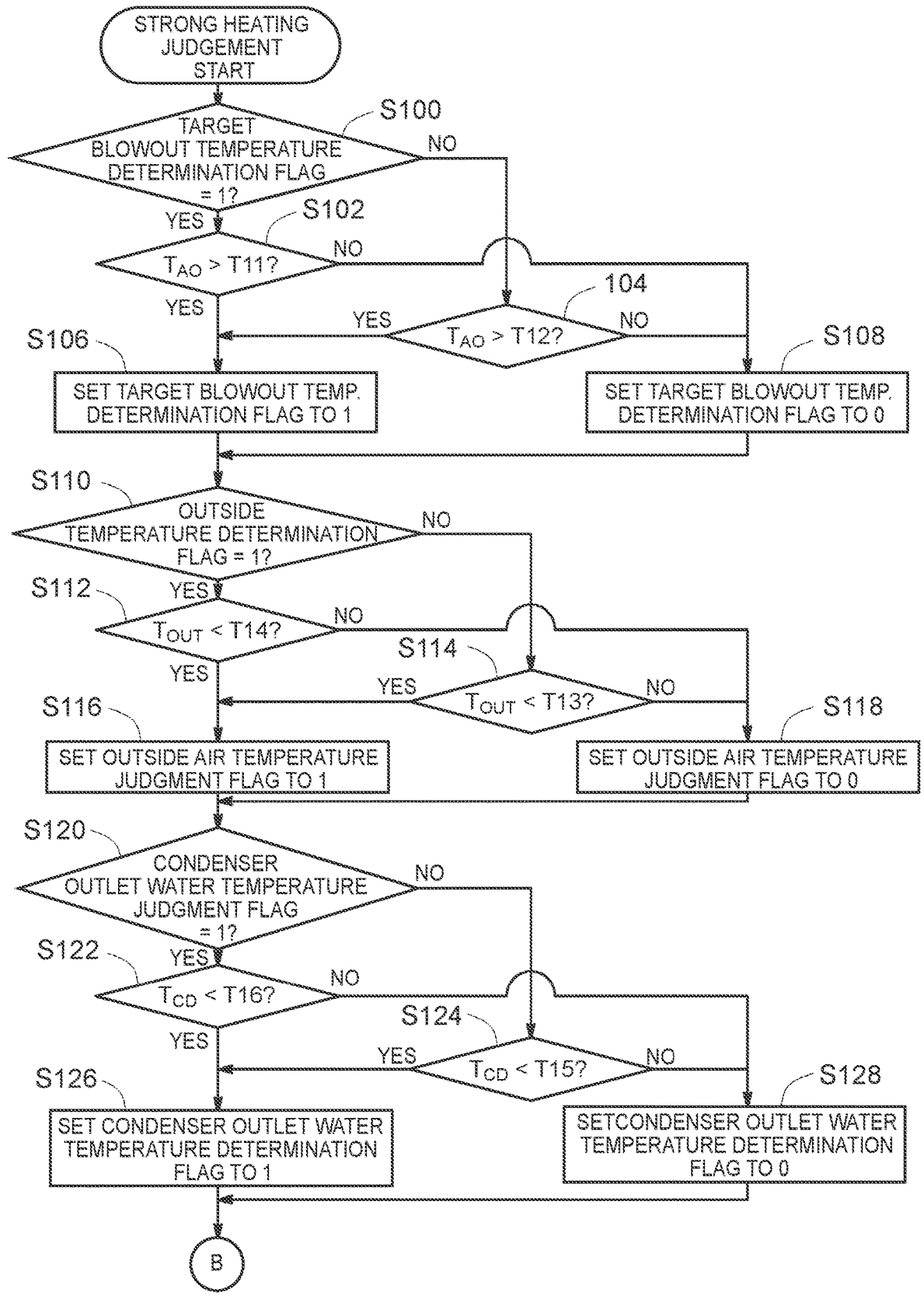
FIG. 13 is a diagram illustrating a strong heating determination flow (1/2) is a sub-process in the execution availability determination flow.
Figure 14:
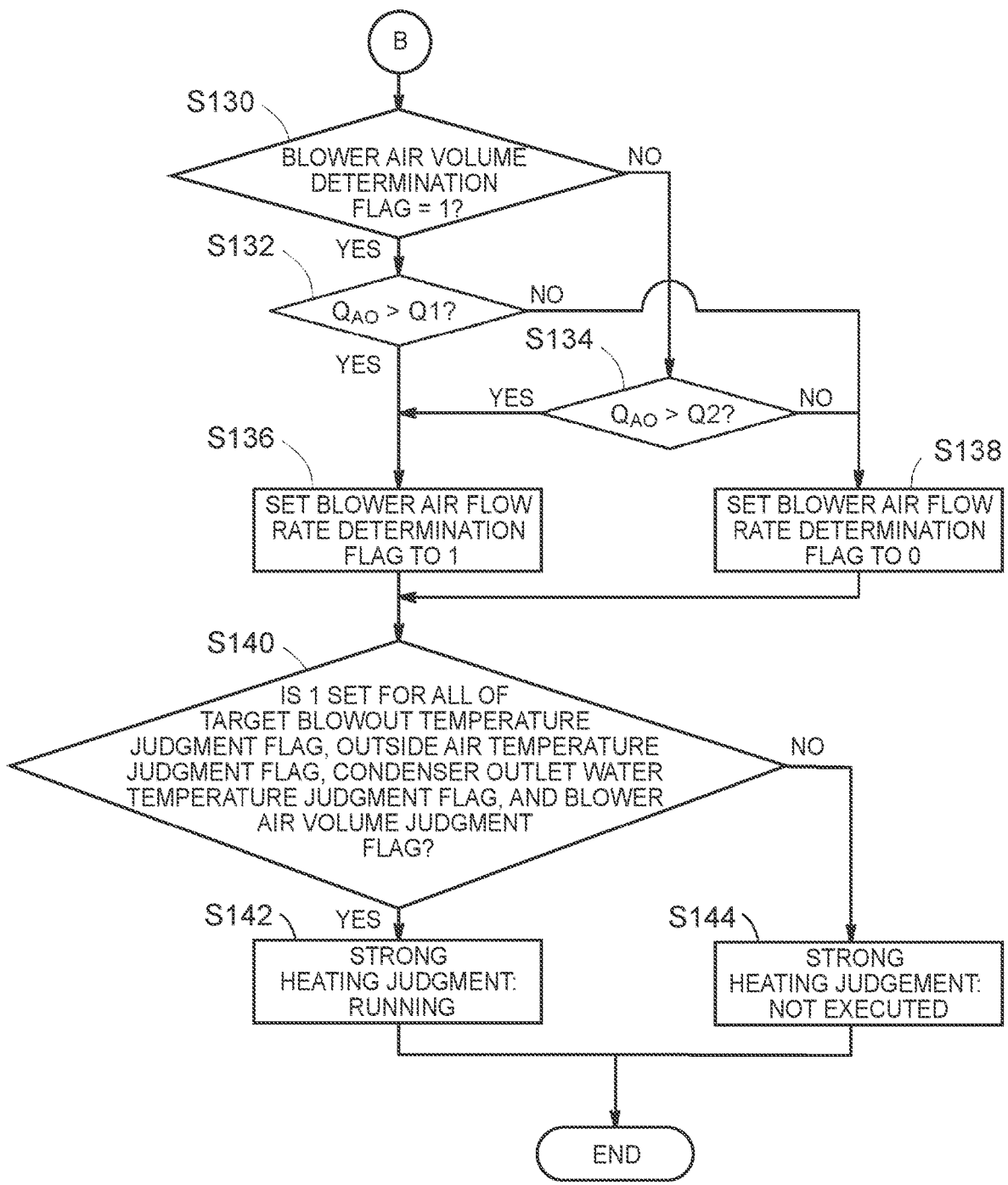
FIG. 14 is a diagram illustrating a strong heating determination flow (2/2) is a sub-process in the execution availability determination flow.
Figure 15:
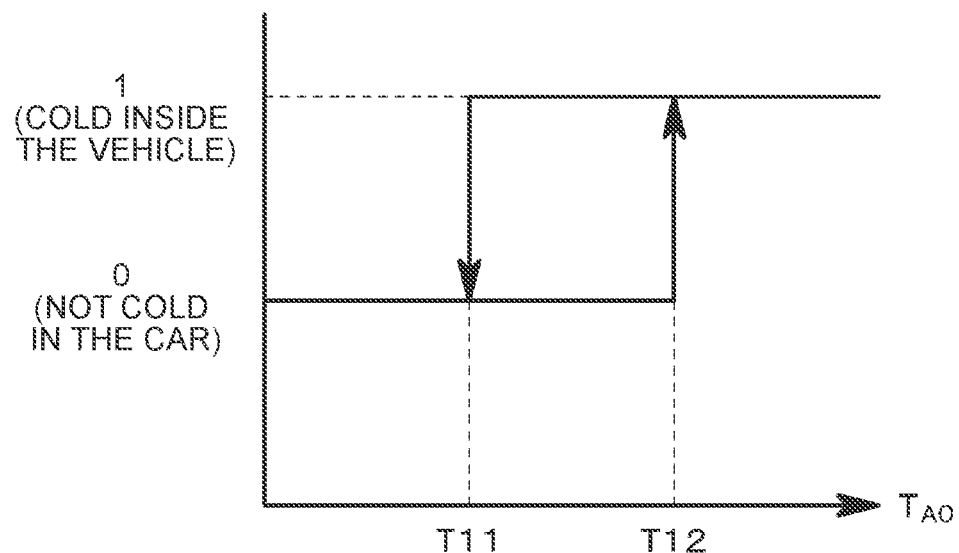
FIG. 15 is a diagram illustrating a target blowout temperature map at the time of heating.

In FIGS. 13 and 14, the strong heating determination flow to be executed by the strong heating determination unit 43D is exemplified. FIG. 15 illustrates a heating target blowout temperature map. In this map, the target blowout temperatures $T_{AO}$ are taken on the horizontal axis. In addition, the map takes the flag values 0,1 on the vertical axis. The maps illustrated in FIGS. 15 to 17 including this map are stored in, for example, the strong heating determination unit 43D. Further, the blower air volume map (see FIG. 12) is also stored in the strong heating determination unit 43D.

In the heating time target blowout temperature map illustrated in FIG. 15, as the heating time blowout threshold temperature $*T_{AO-W/U}$, the temperature value T11 and the temperature value T12 (T11<T12) is determined. For example, the temperature value T11 is set to 25° C., and the temperature value T12 is set to 28° C. Strong heating determination unit 43D refers to the previous value of the heating time target blowout temperature map from the determination result storage unit 43B. Then, the strong heating determination unit 43D confirms whether or not the previous value is 1 (S100).

When the previous value is 1, the strong heating determination unit 43D acquires the present value of the target blowout temperature $T_{AO}$ from the device control unit 43A. Then, the strong heating determination unit 43D determines whether or not the present value exceeds the threshold T11 (S102). If $T_{AO}$>T11, the strong heating determination unit 43D sets the value of the target blowout temperature determination flag to 1 (S106). On the other hand, if $T_{AO}$≤T11, the strong heating determination unit 43D sets the value of the target blowout temperature determination flag to 0 (S108).

Returning to step S100, when the previous value of the heating target blowout temperature map is 0, the strong heating determination unit 43D determines whether or not the present value of the target blowout temperature $T_{AO}$ exceeds the threshold T12 (S104). If $T_{AO}$>T12, the strong heating determination unit 43D sets the value of the target blowout temperature determination flag to 1 (S106). On the other hand, if $T_{AO}$≤T12, the strong heating determination unit 43D sets the value of the target blowout temperature determination flag to 0 (S108).

Figure 16:
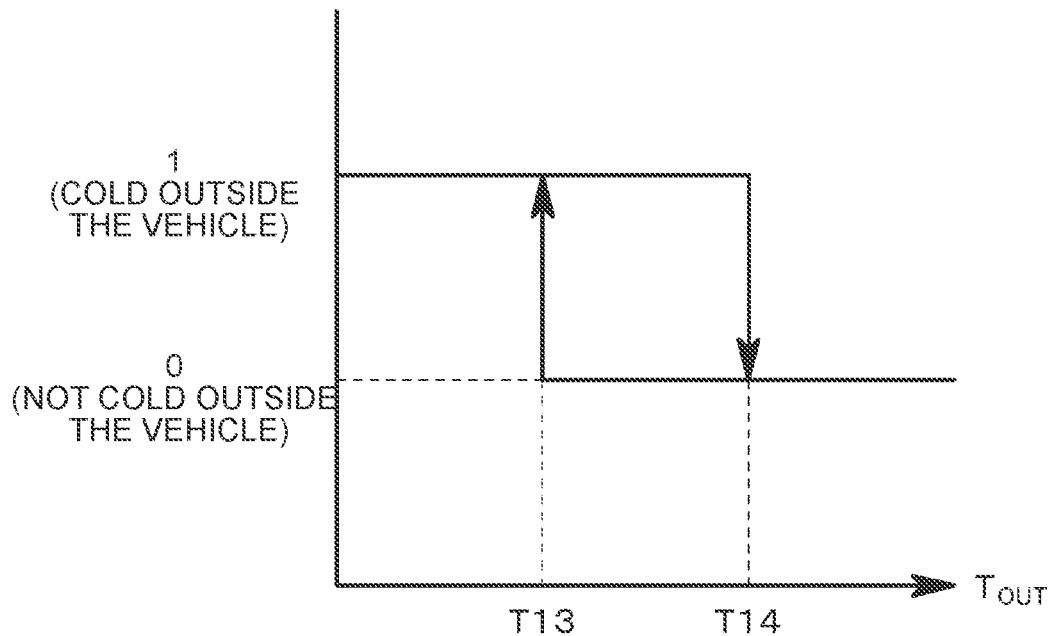
FIG. 16 is a diagram illustrating an outside air temperature map during heating.
Figure 17:
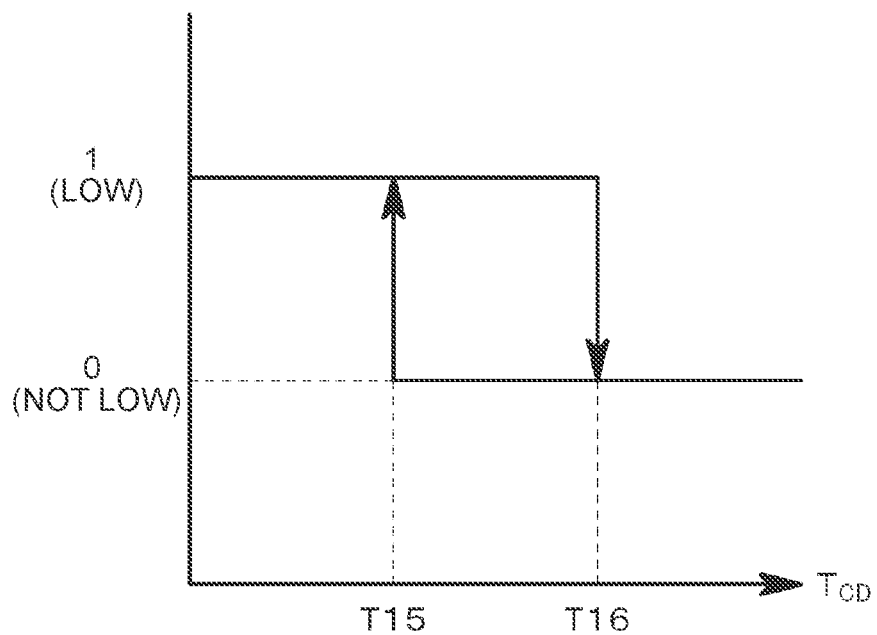
FIG. 17 is a diagram illustrating a condenser outlet water temperature map during heating.

Next, the strong heating determination unit 43D refers to previous values of the outside air temperature map at the time of heating shown in FIG. 16 from the determination result storage unit 43B. Then, the strong heating determination unit 43D determines whether or not the previous value (that is, the determination flag value) is 1 (S110). In this map, the outside air threshold temperatures $*T_{OUT-W/U}$ during heating are the thresholds T13 and T14 (T13<T14). For example, the temperature value T13 is set to 3° C., and the temperature value T14 is set to 6° C.

If the previous value of the heating time outside air temperature map is 1, the strong heating determination unit 43D acquires the present value of the outside air temperature $T_{OUT}$ from the outside air temperature sensor 23. Then, the strong heating determination unit 43D determines whether or not the present value is less than the threshold T14 (S112). If $T_{OUT}$<T14, the strong heating determination unit 43D sets the value of the target blowout temperature determination flag to 1 (S116). On the other hand, if $T_{OUT}$≥T14, the strong heating determination unit 43D sets the value of the outside air temperature determination flag to 0 (S118).

Returning to step S110, when the previous value of the target blowout temperature determination flag is 0, the strong heating determination unit 43D determines whether or not the present value of the outside air temperature $T_{OUT}$ is less than the threshold T13 (S114). If $T_{OUT}<T13$, the strong heating determination unit 43D sets the value of the target blowout temperature determination flag to 1 (S116). On the other hand, if $T_{OUT}\geq T13$, the strong heating determination unit 43D sets the value of the target blowout temperature determination flag to 0 (S118).

Next, the strong heating determination unit 43D refers to the previous value of the condenser outlet water temperature map during heating (see FIG. 17) from the determination result storage unit 43B. Then, the strong heating determination unit 43D confirms whether or not the previous value is 1 (S120). In this map, the heating-time refrigerant threshold temperature $*T_{CD-W/U}$ is the threshold T15 and T16 (T15<T16). For example, the temperature value T15 is set to 40° C. Further, for example, the temperature value T16 is set to 43° C.

When the previous value of the condenser outlet water temperature map during heating is 1, the strong heating determination unit 43D acquires the present value of the condenser outlet water temperature $T_{CD}$ from the condenser outlet water temperature sensor 27. Then, the strong heating determination unit 43D determines whether or not the present value is less than the threshold T16 (S122). If $T_{CD}<T16$, the strong heating determination unit 43D sets the value of the condenser outlet water temperature determination flag to 1 (S126). On the other hand, if $T_{CD}\geq T16$, the strong heating determination unit 43D sets the value of the condenser outlet water temperature determination flag to 0 (S128).

Returning to step S120, when the previous value of the condenser outlet water temperature determination flag is 0, the strong heating determination unit 43D determines whether or not the present value of the condenser outlet water temperature $T_{CD}$ is less than the threshold T15 (S124). When $T_{CD}<T15$, the strong heating determination unit 43D sets the value of the condenser outlet water temperature determination flag to 1 (S126). On the other hand, if $T_{CD}\geq T15$, the strong heating determination unit 43D sets the value of the condenser outlet water temperature determination flag to 0 (S128).

Next, the strong heating determination unit 43D refers to the previous value of the blower air volume map (see FIG. 12) from the determination result storage unit 43B. Then, the strong heating determination unit 43D confirms whether or not the previous value is 1 (S130). When the previous value of the blower air volume map is 1, the strong heating determination unit 43D acquires the present value of the target air volume $Q_{AO}$ of the blower 34 from the device control unit 43A. Then, the strong heating determination unit 43D determines whether or not the present value exceeds the threshold Q1 (S132). If $Q_{AO}>Q1$, the strong heating determination unit 43D sets the value of the blower air volume determination flag to 1 (S136). On the other hand, when $Q_{AO}>Q1$, the strong heating determination unit 43D sets the blower air volume determination flag to 0 (S138).

Returning to step S130, when the previous value of the blower air volume determination flag is 0, the strong heating determination unit 43D determines whether or not the present value of the target air volume $Q_{AO}$ of the blower 34 exceeds the threshold Q2 (S134). If $Q_{AO}>Q2$, the strong heating determination unit 43D sets the value of the blower air volume determination flag to 1 (S136). On the other hand, if $Q_{AO}\leq Q2$, the strong heating determination unit 43D sets the value of the blower air volume determination flag to 0 (S138).

Further, the strong heating determination unit 43D determines whether or not the flag value 1 is set in all of the target blowout temperature determination flag, the outside air temperature determination flag, the condenser outlet water temperature determination flag, and the blower air volume determination flag (S140). When all four flags are flag value 1, the strong heating determination unit 43D and the air conditioner 25 is in the strong heating execution, it determines (S142). On the other hand, if at least one of the above four flags takes the flag value 0, the air conditioner 25 is strong heating determination unit 43D and not executing the strong heating, it is determined (S144).

As described above, in the strong cooling and strong heating determination flow according to the present embodiment, the execution determination of strong cooling and strong heating is not performed unless all the conditions relating to the target blowout temperature, the outside air temperature, the condenser outlet water temperature, and the blower air volume are satisfied. Thus, by limiting the establishment conditions of the strong cooling and the strong heating, the operation restriction of excessive air conditioning is avoided. In addition, the comfort of the occupant can be improved.

<Air Conditioner Operation Restriction>

Figure 18:
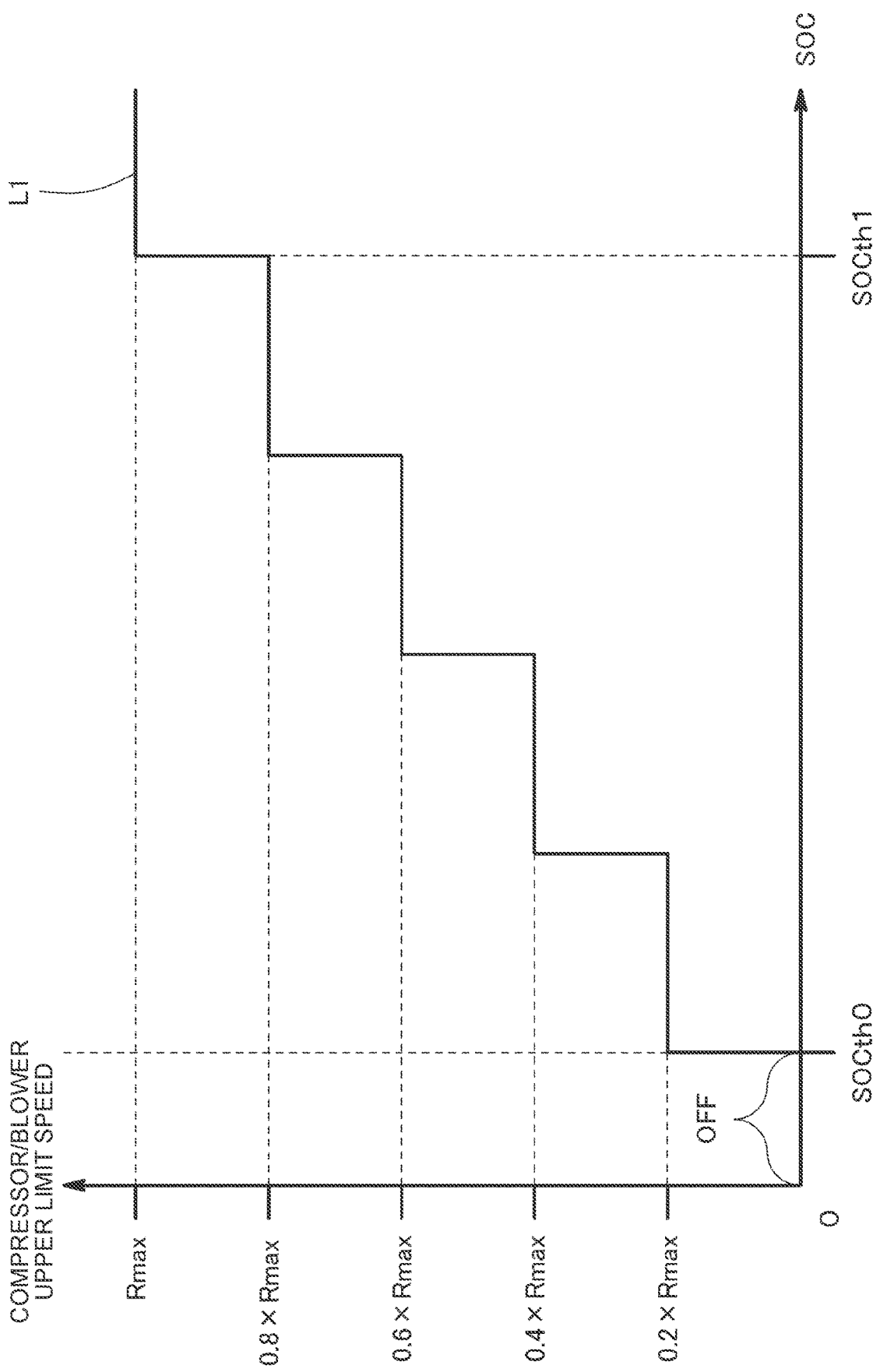
FIG. 18 is a diagram illustrating a rotational speed limit map of the compressor and the blower as an example of the operation restriction control of the air conditioning apparatus.
Figure 19:
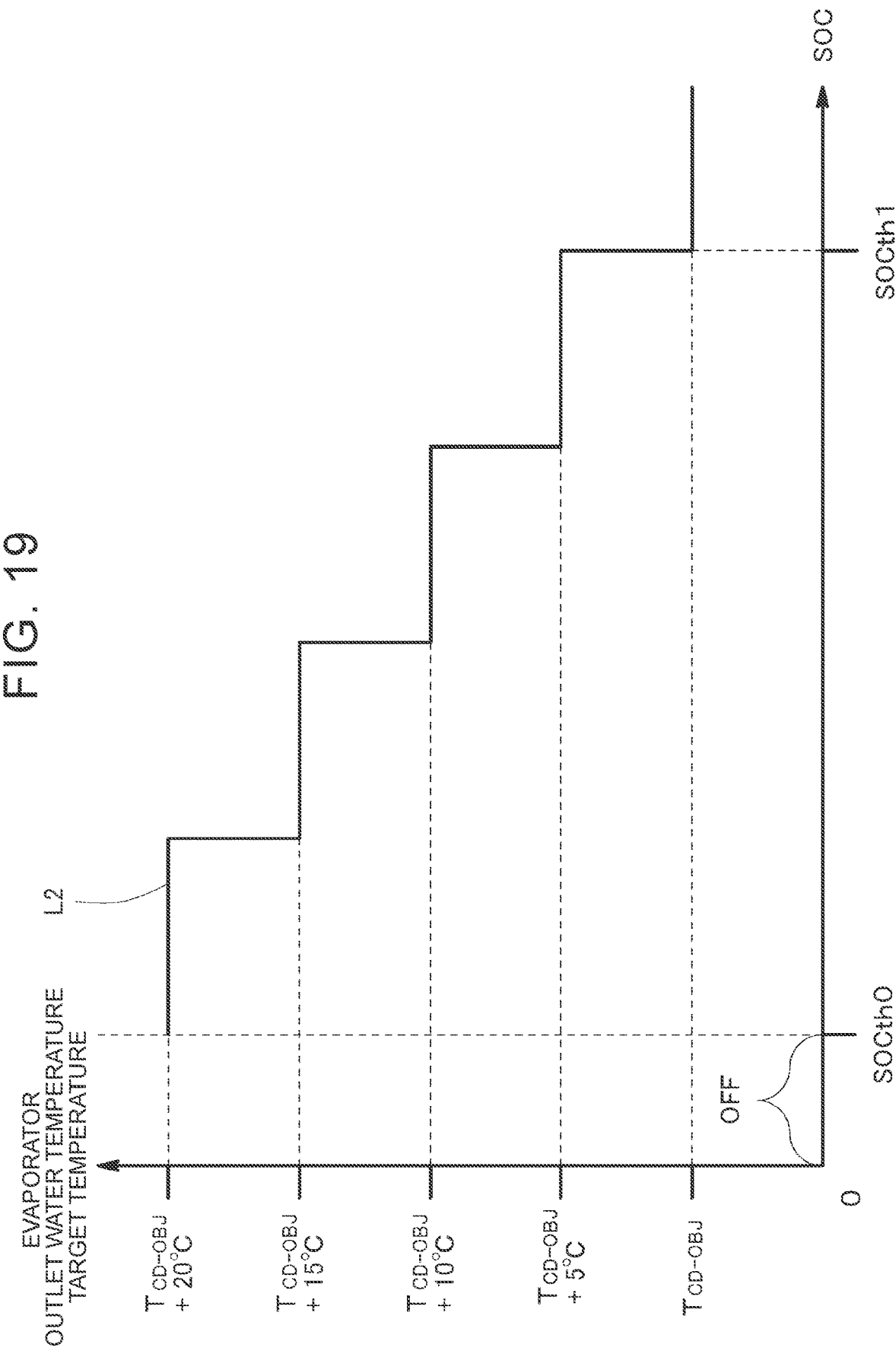
FIG. 19 is a diagram illustrating an evaporator outlet water temperature limit map as an example of the operation restriction control of the air conditioning apparatus.
Figure 20:
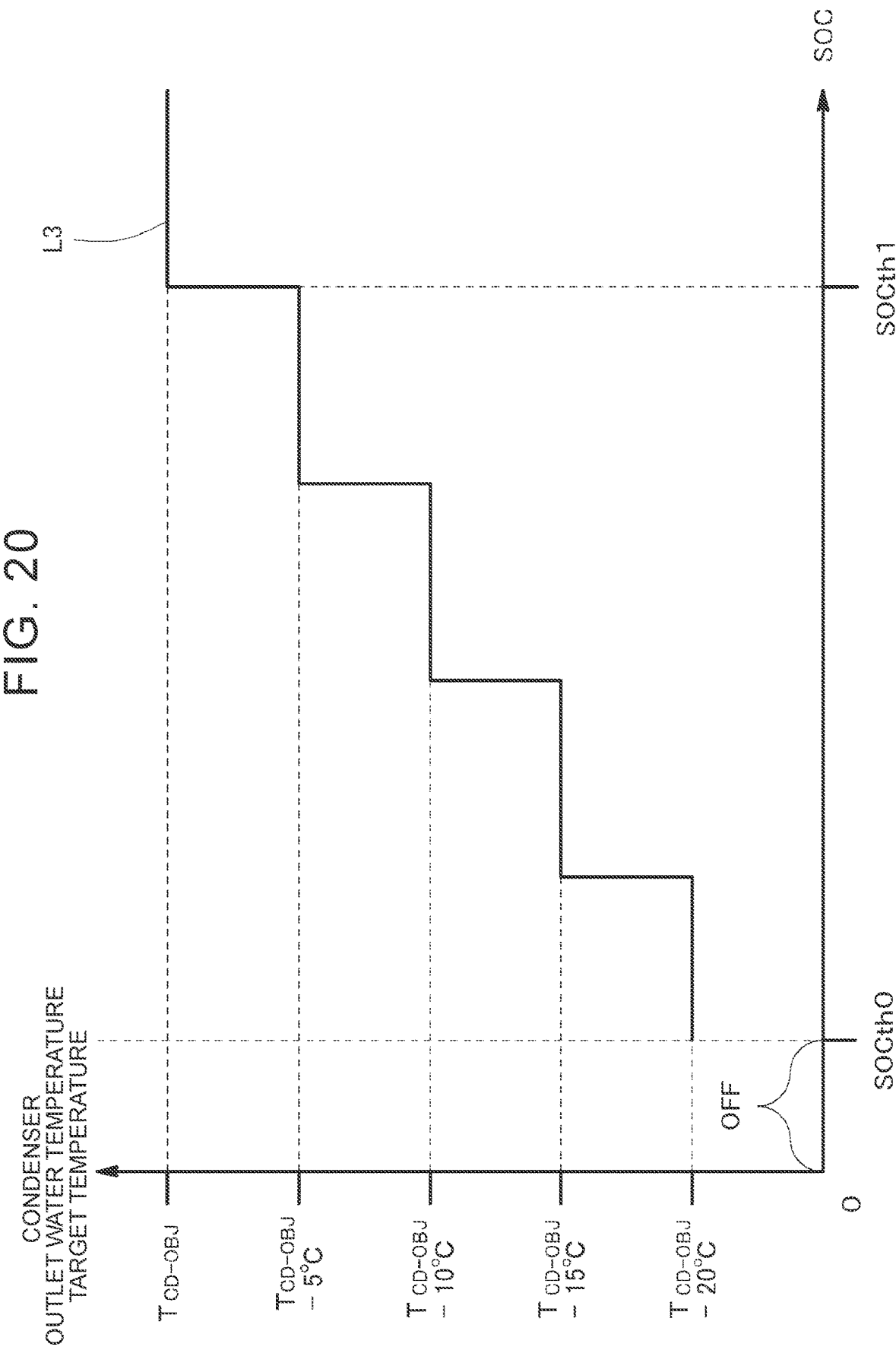
FIG. 20 is a diagram illustrating a condenser outlet water temperature limit map as an example of the operation restriction control of the air conditioning apparatus.

When the limit execution command is received from the power limit determination unit 40A of HV-ECU 40, the device control unit 43A, based on the air conditioning limit map illustrated in FIGS. 18 to 20, the operation restriction of the air conditioner 25.

The restriction map of FIG. 18 shows the SOC of the battery 10 on the horizontal axis. In addition, the restriction map of FIG. 18 shows the upper rotational speed limit of the compressor 33 and the blower 34 on the vertical axis. On the coordinate plane defined by the horizontal axis and the vertical axis, the limit characteristic line L1 is set. The limit characteristic line L1 is set, for example, in a stepwise shape with a right shoulder rising.

For example, when the SOC of the battery 10 is equal to or higher than a predetermined battery determination threshold SOCth1, the upper limit rotational speed of the compressor 33 and the blower 34 can be set to a maximum rotational speed Rmax. On the other hand, when the SOC of the battery 10 is less than the battery determination threshold SOCth1, the upper limit rotational speed of the compressor 33 and the blower 34 is gradually reduced along the characteristic line L1 as the SOC approaches 0. Further, when the SOC of the battery 10 is less than a predetermined battery protection threshold SOCth0, the upper limit rotational speed of the compressor 33 and the blower 34 becomes 0.

Additionally, the compressor 33 and blower 34 are shut down when the SOCs of the batteries 10 are less than a predetermined battery protection threshold SOCth0.

The SOC of the battery 10 is transmitted to the device control unit 43A together with the limit executing command from the power limit determination unit 40A. In response, the device control unit 43A, based on the received SOC and the limit characteristic line L1, obtains the upper limit rotational speed of the compressor 33.

After the upper limit rotational speed is determined, the required rotational speed of the compressor 33 with the operation to the temperature setting button 52A, 52B of the air conditioning operation panel 50, when exceeding the upper limit rotational speed, the device control unit 43A, (contrary to the operation) the set rotational speed of the compressor 33, the upper limit rotational speed rather than the required rotational speed It is determined.

In FIG. 19, a limiting map is illustrated with respect to the target temperature of the outlet water temperature of the evaporator 31 (see FIG. 3) used during cooling. In this restriction map, the SOC of the battery 10 is shown on the horizontal axis. In addition, in this restriction map, the target temperature of the evaporator outlet water temperature is indicated on the vertical axis. A limit characteristic line L2 is set on a coordinate plane defined by the horizontal axis and the vertical axis. The limit characteristic line L2 is set, for example, in a stepwise shape with a right shoulder decreasing.

For example, when the SOC of the battery 10 is equal to or higher than a predetermined battery determination threshold SOCth1, the target temperature of the evaporator outlet water temperature is set to the temperature $T_{EV\text{-}OBJ}$ during normal operation. On the other hand, when the SOC of the battery 10 is less than the battery determination threshold SOCth1, along the characteristic line L2, the target temperature of the evaporator outlet water temperature is raised stepwise as the SOC approaches 0. For example, a value obtained by adding a predetermined temperature (5° C. to 20° C.) to the temperature $T_{EV\text{-}OBJ}$ during normal operation, the determination value of the target temperature value of the evaporator outlet water temperature.

In FIG. 20, a restriction map is exemplified with respect to the target temperature of the outlet water temperature of the indoor condenser 32 (see FIG. 3) used during heating. In this restriction map, the SOC of the battery 10 is shown on the horizontal axis. In addition, in this restriction map, the target temperature of the condenser outlet water temperature is shown on the vertical axis. On the coordinate plane defined by the horizontal axis and the vertical axis, the limit characteristic line L3 is set. The limit characteristic line L3 is set, for example, in a stepwise shape with a right shoulder rising.

For example, when the SOC of the battery 10 is equal to or higher than a predetermined battery determination threshold SOCth1, the target temperature of the condenser outlet water temperature is set to the temperature $T_{CD\text{-}OBJ}$ during normal operation.

On the other hand, when the SOC of the battery 10 is less than the battery determination threshold SOCth1, along the characteristic line L3, the target temperature of the condenser outlet water temperature is raised stepwise as the SOC approaches 0. For example, a value obtained by subtracting a predetermined temperature (20° C. from 5° C.) to the temperature $T_{CD\text{-}OBJ}$ during normal operation, the determined value of the target temperature value of the condenser outlet water temperature.

If the actual value of the evaporator outlet water temperature or the condenser outlet water temperature deviates from the target temperature, feedback control is performed so as to reduce the difference between the actual value and the target value. For example, in the cooling, when the actual value is higher than the target temperature, the rotational speed of the compressor 33 and the blower 34 is raised, also the target blowout temperature is reduced. Furthermore, for example, in the heating, when the actual value is lower than the target temperature, the rotational speed of the compressor 33 and the blower 34 is raised, also the target blowout temperature is increased (when heating). As in FIGS. 19 and 20, by the operation restriction is applied so as to reduce the difference between the target temperature and the actual value, the rotational speed increase of the compressor 33 and the blower 34, reduction of the target blowout temperature (during cooling) or increase (during heating) can be suppressed.

Incidentally, over the entire period in which the operation restriction to the air conditioner 25 is executed, the device control unit 43A controls the inside and outside air switching door 67A (see FIG. 3). Then, the device control unit 43A closes the outside air introduction port 62. That is, the device control unit 43A by fully opening the inside air introduction port 61 over the entire duration of the operation restriction, the air conditioning control by the inner air circulation is performed.

By internal air circulation is performed, repeatedly air flows into the air conditioner 25. Therefore, even under the operation restriction of the air conditioner 25, it is possible to approach the target blowout temperature $T_{AO}$ in stages.

In general, since the humidity in the vehicle cabin increases due to the internal air circulation, there is a possibility that fogging occurs in the window material such as windshield glass. However, as described above, in the ignition-off state in which the vehicle 100 is not allowed to travel, external power supply becomes available. Therefore, a situation in which the window material becomes cloudy and visibility becomes poor, which makes driving difficult, does not occur in the first place.

Such, in order to reliably enable the air conditioning control by the inside air circulation, the device control unit 43A does not accept the operation of the inside and outside air switching switch 56 from the air conditioning operation panel 50 (see FIG. 4). For example, over the entire period in which the operation restriction is executed, the device control unit 43A invalidates the outside air introduction command by the input-operation from the air conditioning operation panel 50.

Incidentally, when the outdoor air introduction operation is prohibited in this way, by the occupant opens the window, the fogging of the window material is eliminated. In order to enable such an operation, the window regulator (not shown) is set to be operable regardless of whether or not the operation restriction on the air conditioner 25 is executed.

<Relationship between Operation Restrictions and Strong Air-Conditioning/Strong Air-Conditioning Judgments>

By operation restriction is imposed on the air conditioner 25, the vehicle cabin temperature is hot (during cooling) or cold (during heating) state is maintained for a while. Therefore, the target blowout temperature T is maintained at a low value (during cooling) or a high value (during heating) at the target blowout temperature $T_{AO}$. That is, in the strong cooling determination and strong heating determination, the condition in which the target blowout temperature determination flag is set to 1 is maintained.

Further, according to the restriction map of FIGS. 19 and 20, the evaporator outlet water temperature (during cooling) is maintained at a high temperature. Furthermore, by the restriction map of FIGS. 19 and 20, the condenser outlet water temperature (during heating) is maintained at a low temperature. Along with this, the evaporator outlet water temperature determination flag (during cooling) and the condenser outlet water temperature determination flag (during heating) are maintained under the condition of being set to 1.

On the other hand, when the outside air temperature decreases (during cooling) or rises (during heating), the outside air temperature determination flag can be set to 0. Further, when the occupant narrows the blower air volume, the blower air volume determination flag can be set to 0. Such external conditions and the operation of the occupant, the determination of the strong cooling and heating is canceled.

<Alternative Example of Air Conditioner>

Figure 21:
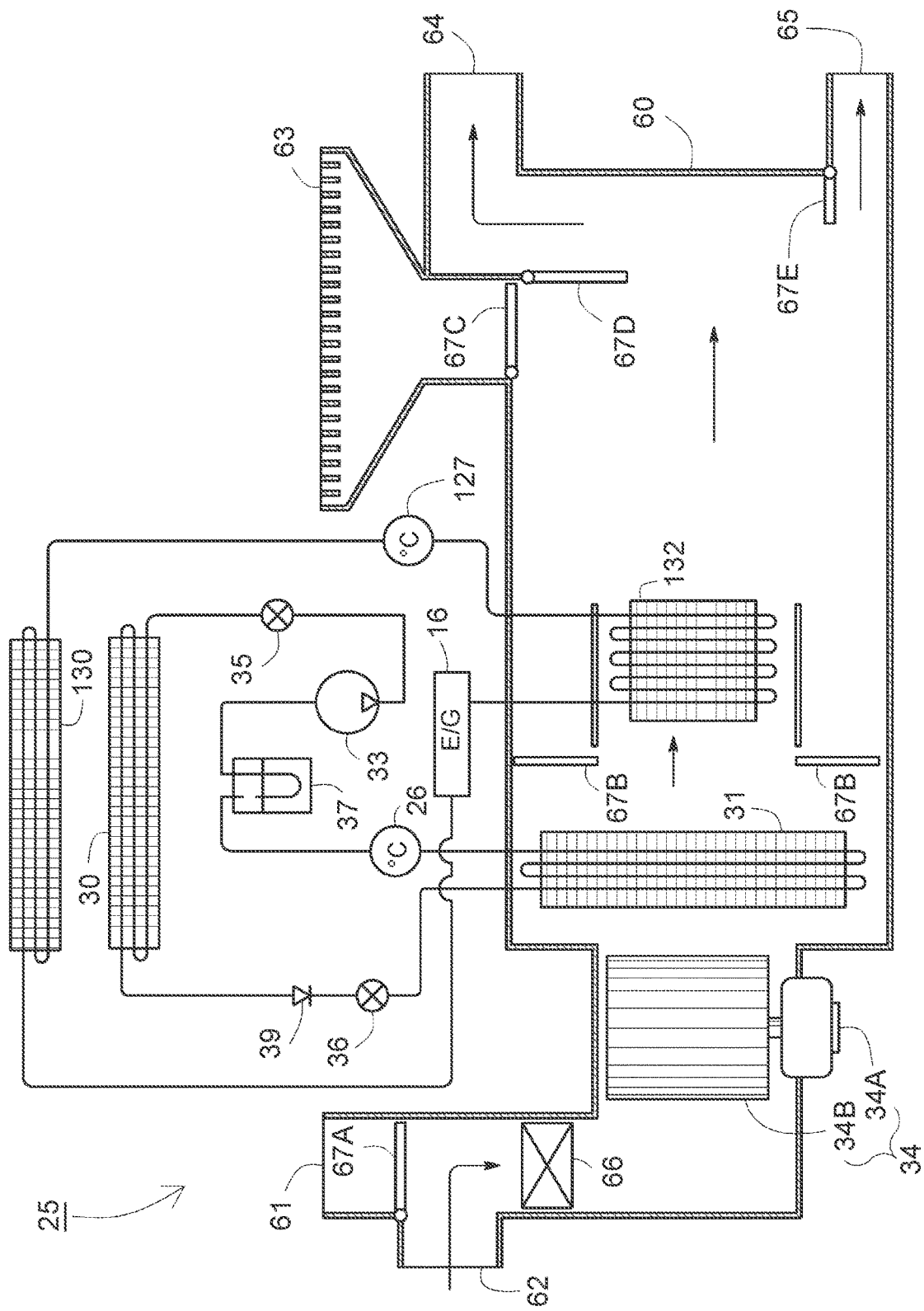
FIG. 21 is a diagram showing another example of an air conditioner in which a heater is used as a heating function.

Another example of an air conditioner 25 is shown in FIG. 21. The air conditioner 25, unlike the heat pump type as in FIG. 3, the heating mechanism and the cooling mechanism is separated. Specifically, a heater mechanism comprising a radiator 130, an internal combustion engine 16, and a heater core 132 is provided in the air conditioner 25. Furthermore, the refrigerant outlet of the heater core 132, the heater outlet water temperature sensor 127 for detecting the refrigerant temperature is provided. Further, the compressor 33, the outdoor condenser 30, the evaporator 31, and the cooler mechanism comprising an accumulator 37 is provided in the air conditioner 25.

Also in such an air conditioner 25, the execution determination flow of the operation restriction illustrated in FIG. 6 is executed by the power limit determination unit 40A of HV-ECU 40. In addition, the strong cooling determination is executed by the strong cooling determination unit 43C of the air conditioning ECU 43. Furthermore, strong heating determination is executed by the strong heating determination unit 43D.

Figure 22:
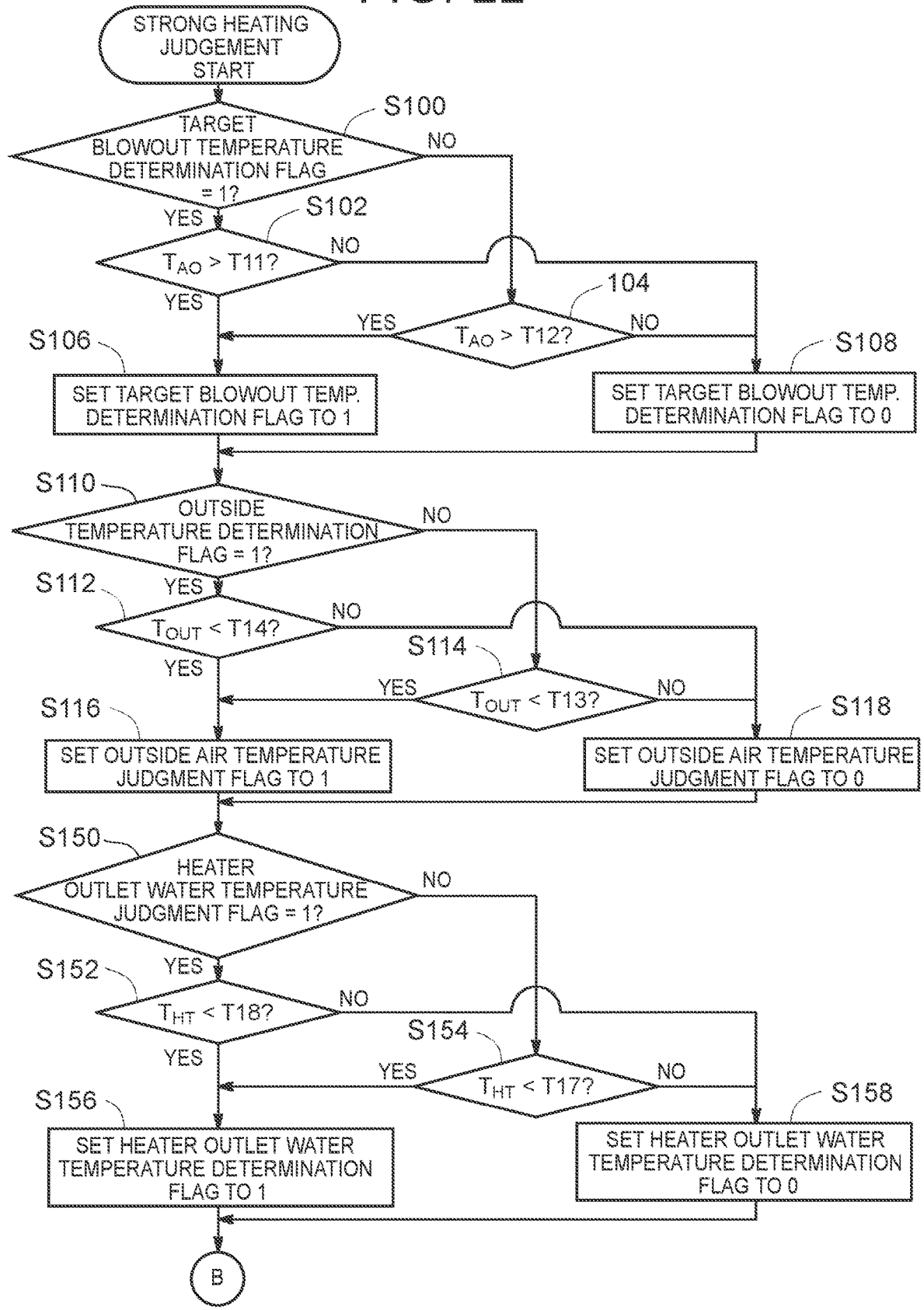
FIG. 22 is a diagram illustrating a strong heating determination flow (1/2) in another example of an air conditioner.
Figure 23:
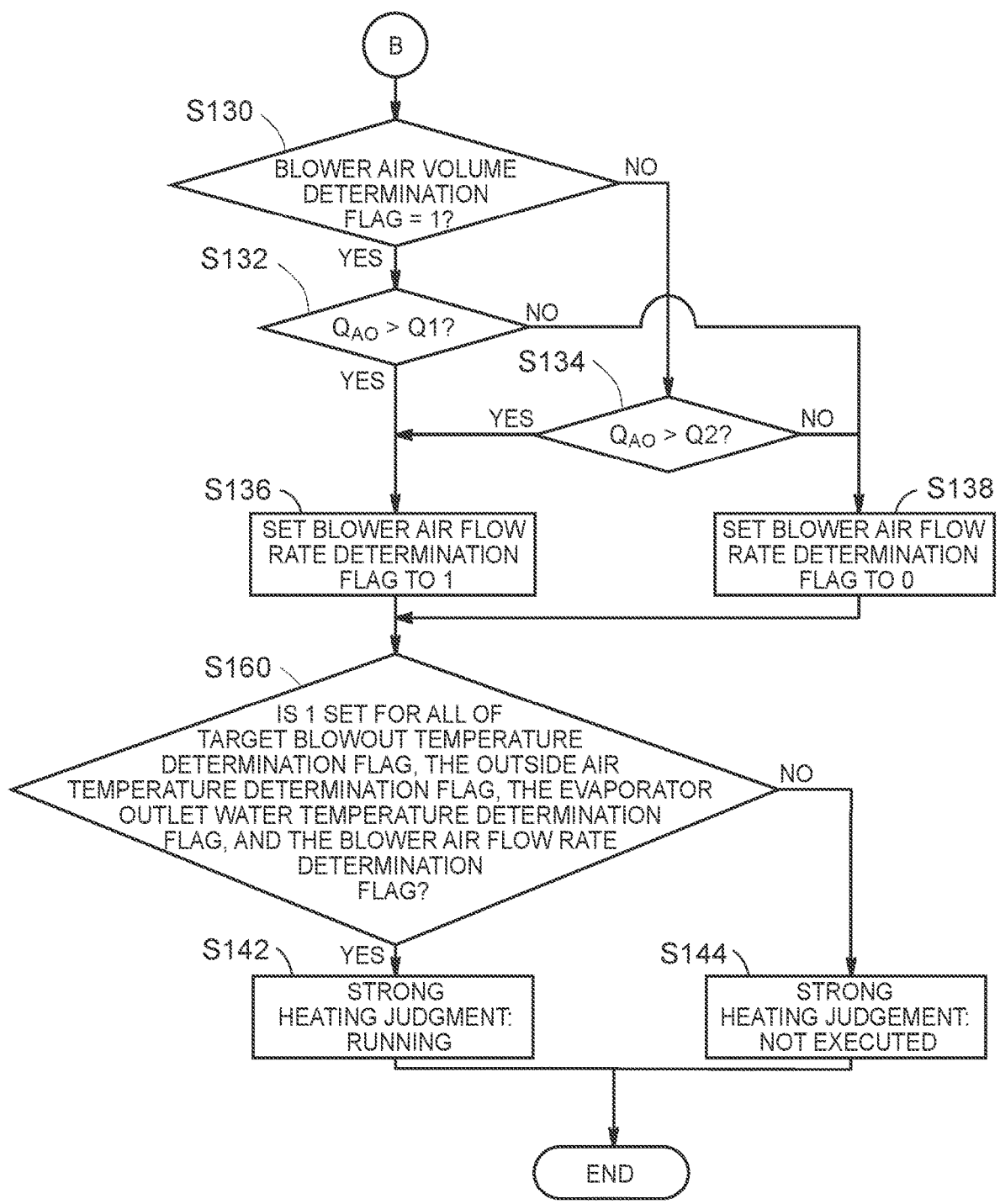
FIG. 23 is a diagram illustrating a strong heating determination flow (2/2) in another example of an air conditioner.

In FIGS. 22 and 23, strong heating determination flowchart by the strong heating determination unit 43D is exemplified. This flow, as compared with the strong heating determination flow of FIGS. 13 and 14, the step group of the condenser outlet water temperature determination (S120 to S128) replaces the step group of the heater outlet temperature determination (S150 to S158). Further, in step S140 of FIG. 14, instead of the value of the condenser outlet water temperature determination flag is confirmed, in step S160 of FIG. 23, the value of the heater outlet water temperature determination flag is confirmed. Since the remaining steps are the same as those in FIGS. 13 and 14, the description thereof will be omitted below as appropriate.

Figure 24:
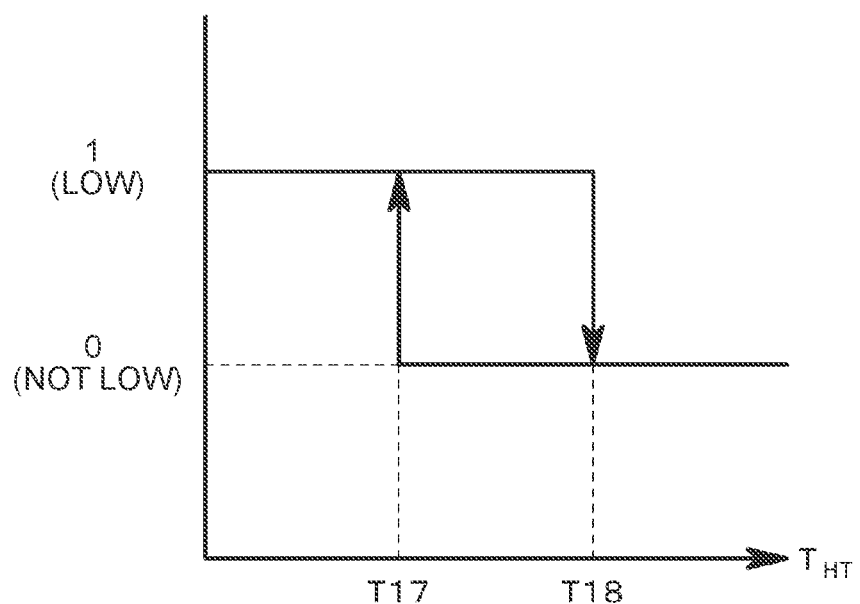
FIG. 24 is a diagram illustrating a heater outlet water temperature map in another example of an air conditioner.

Further, in the strong heating determination unit 43D, instead of the condenser outlet water temperature map (see FIG. 17), the heater outlet water temperature map exemplified in FIG. 24 is stored. In this map, the refrigerant threshold temperature $*T_{HT\text{-}W/U}$ during heating has become the threshold T17 and the threshold T18 (T17<T18). For example, the temperature value T17 is set to 40° C., and the temperature value T18 is set to 43° C.

In the strong heating determination flow of FIGS. 22 and 23, after the step S116 or step S118 is executed, the strong heating determination unit 43D refers to the previous value of the heater outlet water temperature map from the determination result storage unit 43B. Then, the strong heating determination unit 43D confirms whether or not the previous value is 1 (S150).

If the previous value of the heater outlet water temperature map is 1, the strong heating determination unit 43D acquires the present value of the heater outlet water temperature $T_{HT}$ from the heater outlet water temperature sensor 127. Then, the strong heating determination unit 43D determines whether or not the present value is less than the threshold T18 (S152). If $T_{HT}$<T18, the strong heating determination unit 43D sets the value of the heater outlet water temperature determination flag to 1 (S156). On the other hand, if $T_{HT}$≥T18, the strong heating determination unit 43D sets the value of the heater outlet water temperature determination flag to 0 (S158).

Returning to step S150, when the previous value of the heater outlet water temperature determination flag is 0, the strong heating determination unit 43D determines whether or not the present value of the heater outlet water temperature $T_{HT}$ is less than the threshold T17 (S154). If $T_{HT}$<T17, the strong heating determination unit 43D sets the value of the heater outlet water temperature determination flag to 1 (S156). On the other hand, if $T_{HT}$≥T17, the strong heating determination unit 43D sets the value of the heater outlet water temperature determination flag to 0 (S158).

Then, in FIG. 23, after the step S136 and step S138 is executed, the target blowout temperature determination flag, the outside air temperature determination flag, the heater outlet water temperature determination flag, and in all of the blower air volume determination flag, the strong heating determination unit 43D whether the flag value 1 is set is determined (S160). When all four flags are flag value 1, the strong heating determination unit 43D and the air conditioner 25 is in the strong heating execution, it determines (S142). On the other hand, if at least one of the above four flags takes the flag value 0, the strong heating determination unit 43D and the air conditioner 25 is not executing the strong heating, it is determined (S144).

Further, when the operation restriction execution of the air conditioner 25, instead of the limit map (see FIG. 20) relating to the target temperature of the outlet water temperature of the indoor condenser 32 (see FIG. 3), the heater core 132 (see FIG. 21) limit map relating to the target temperature of the outlet water temperature (see FIG. 25) is used.

In this restriction map, the SOC of the battery 10 is shown on the horizontal axis. Furthermore, in this restriction map, the target temperature of the heater outlet water temperature is indicated on the vertical axis. On the coordinate plane defined by the horizontal axis and the vertical axis, the limit characteristic line L4 is set. The limit characteristic line L4 is set, for example, in a stepwise shape with a right shoulder rising.

For example, when the SOC of the battery 10 is equal to or higher than a predetermined battery determination threshold SOCth1, the target temperature of the heater outlet water temperature is set to the temperature $T_{HT\text{-}OBJ}$ during normal operation. On the other hand, when the SOC of the battery 10 is less than the battery determination threshold SOCth1, along the characteristic line L4, the target temperature of the condenser outlet water temperature is raised stepwise as the SOC approaches 0.

<Another Example of an Execution Determination Flow of an Operation Restriction>

In the execution determination flow illustrated in FIG. 6, when the SOC of the battery 10 becomes less than the SOC SOCth1, it is determined whether or not the operation restriction can be executed. However, the SOC condition may be omitted. That is, in the determination flow of FIG. 6, even when the SOC of the battery 10 is high by omitting step S16, the air conditioning control may be performed so as to be able to regulate the strong cooling and heating. In this way, it is possible to increase the power charged to the external power supply.

What is claimed is:

1. A vehicle power management system comprising:
a battery installed in a vehicle;
an air conditioner for a vehicle cabin, the air conditioner being driven by power of the battery;
an external power supply device that enables external power supply in which the power of the battery is supplied to an external electric device; and
a determination unit that determines whether an operation restriction of the air conditioner is executed during the external power supply, wherein the determination unit determines that the operation restriction is executed when all of following four conditions are satisfied, regarding a cooling operation state of the air conditioner, as determination of whether the operation restriction is executed:

(A-1) a target blowout temperature is less than a predetermined blowout threshold temperature during cooling;

(A-2) an outside air temperature exceeds a predetermined outside air threshold temperature during cooling;

(A-3) a refrigerant temperature after heat is exchanged with an air blown into the vehicle cabin exceeds a predetermined refrigerant threshold temperature during cooling; and (A-4) a blower air volume of the air conditioner exceeds a predetermined threshold air volume.

2. The vehicle power management system according to claim 1, wherein the determination unit determines whether the operation restriction is executed when a state of charge of the battery is less than a predetermined battery determination threshold.

3. The vehicle power management system according to claim 1, wherein when the determination unit outputs determination for executing the operation restriction, the air conditioner closes an outside air introduction port for an entire period in which the operation restriction is executed.

4. The vehicle power management system according to claim 1, wherein when the determination unit outputs determination for executing the operation restriction, the air conditioner invalidates an outside air introduction command by an input operation from an air conditioning operation panel inside the vehicle for an entire period in which the operation restriction is executed.

5. A vehicle power management system comprising:
   a battery installed in a vehicle;
   an air conditioner for a vehicle cabin, the air conditioner being driven by power of the battery;
   an external power supply device that enables external power supply in which the power of the battery is supplied to an external electric device; and
   a determination unit that determines whether an operation restriction of the air conditioner is executed during the external power supply, wherein the determination unit determines that the operation restriction is executed when all of following four conditions are satisfied, regarding a heating operation state of the air conditioner, as determination of whether the operation restriction is executed:

(B-1) a target blowout temperature exceeds a predetermined blowout threshold temperature during heating;

(B-2) an outside air temperature is less than a predetermined outside air threshold temperature during heating;

(B-3) a refrigerant temperature after heat is exchanged with an air blown into the vehicle cabin is less than a predetermined refrigerant threshold temperature during heating; and (B-4) a blower air volume of the air conditioner exceeds a predetermined threshold air volume.

6. The vehicle power management system according to claim 5, wherein the determination unit determines whether the operation restriction is executed when a state of charge of the battery is less than a predetermined battery determination threshold.

7. The vehicle power management system according to claim 5, wherein when the determination unit outputs determination for executing the operation restriction, the air conditioner closes an outside air introduction port for an entire period in which the operation restriction is executed.

8. The vehicle power management system according to claim 5, wherein when the determination unit outputs determination for executing the operation restriction, the air conditioner invalidates an outside air introduction command by an input operation from an air conditioning operation panel inside the vehicle for an entire period in which the operation restriction is executed.

* * * * *